US010050745B2

United States Patent
Suda

(10) Patent No.: US 10,050,745 B2
(45) Date of Patent: Aug. 14, 2018

(54) WIRELESS COMMUNICATIONS SYSTEM, TERMINAL, BASE STATION, AND PROCESS METHOD

(71) Applicant: FUJITSU LIMITED, Kawasaki-shi, Kanagawa (JP)

(72) Inventor: Kenji Suda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 15/269,309

(22) Filed: Sep. 19, 2016

(65) Prior Publication Data
US 2017/0005756 A1    Jan. 5, 2017

Related U.S. Application Data

(63) Continuation of application No. PCT/JP2014/058391, filed on Mar. 25, 2014.

(51) Int. Cl.
*H04B 7/14*    (2006.01)
*H04L 1/08*    (2006.01)
*H04L 1/00*    (2006.01)
*H04L 1/18*    (2006.01)

(52) U.S. Cl.
CPC ............. *H04L 1/08* (2013.01); *H04L 1/0009* (2013.01); *H04L 1/0026* (2013.01); *H04L 1/189* (2013.01); *H04L 1/1822* (2013.01)

(58) Field of Classification Search
CPC ........................................................ H04L 1/08
See application file for complete search history.

(56) References Cited

U.S. PATENT DOCUMENTS

| 8,320,341 B2 * | 11/2012 | Malkamaki ........... H04L 1/1812 370/336 |
| 9,144,066 B2 * | 9/2015 | Vos ..................... H04W 72/042 |
| 2008/0084844 A1 * | 4/2008 | Reznik ................. H04L 1/0025 370/330 |
| 2010/0067412 A1 | 3/2010 | Kitazoe et al. |

(Continued)

FOREIGN PATENT DOCUMENTS

| JP | 2012-500592 A | 1/2012 |
| JP | 2013-9401 A | 1/2013 |

(Continued)

OTHER PUBLICATIONS

Ericsson, "HARQ timing for enhanced coverage MTC UE", Agenda Item: 7.2.2.2.3, 3GPP TSG-RAN WG1 Meeting #76, R1-140747, Prague, Czech Republic, Feb. 10-14, 2014.

(Continued)

*Primary Examiner* — Gerald A Smarth
(74) *Attorney, Agent, or Firm* — Myers Wolin, LLC.

(57) ABSTRACT

A wireless communications system includes a terminal configured to adjust a transmission count of consecutive transmissions of a same data to a base station, based on a radio resource count of radio resources assigned to the terminal, among plural radio resources of a control channel received from the base station; and the base station configured to identify the transmission count based on the radio resource count of the radio resources assigned to the terminal among the plural radio resources of the transmitted control channel, and receive the same data consecutively transmitted by the terminal, based on the identified transmission count.

19 Claims, 34 Drawing Sheets

(56) References Cited

U.S. PATENT DOCUMENTS

| | | | |
|---|---|---|---|
| 2010/0192035 A1 | 7/2010 | Sagfors et al. | |
| 2012/0307767 A1* | 12/2012 | Yamada | H04W 74/02 370/329 |
| 2013/0235768 A1* | 9/2013 | Earnshaw | H04L 1/1671 370/280 |
| 2014/0010105 A1 | 1/2014 | Sakabe | |
| 2014/0119349 A1 | 5/2014 | Takano | |

FOREIGN PATENT DOCUMENTS

| | | |
|---|---|---|
| JP | 2013-38720 A | 2/2013 |
| WO | 2012/127591 A1 | 9/2012 |

OTHER PUBLICATIONS

Samsung, "Discussion on LTE Coverage Enhancement Methods for Medium Data Rate PUSCH", Agenda Item: 7.2.4.2, 3GPP TSG-RAN WG1 Meeting #74bis, R1-134171, Guangzhou, China, Oct. 7-11, 2013.

International Search Report issued for corresponding International Patent Application No. PCT/JP2014/058391, dated Jun. 24, 2014.

International Preliminary Report on Patentability for corresponding International Patent Application No. PCT/JP2014/058391, dated Jun. 24, 2014, with partial English translation.

Samsung, "PRACH Coverage Enhancements for MTC UEs", Agenda Item: 7.2.2.2.2, 3GPP TSG RAN WG1 #76, R1-140355, Prague, Czech Republic, Feb. 10-14, 2014.

Interdigital, "PRACH Coverage Enhancement for MTC UE", Agenda Item: 7.2.2.2.2, 3GPP TSG RAN WG1 Meeting #76, R1-140649, Prague, Czech Republic, Feb. 10-14, 2014.

Extended European search report with supplementary European search report and the European search opinion issued by the European Patent Office for corresponding European Patent Application No. 14887310.2, dated Oct. 9, 2017.

Notification of Reasons for Refusal issued by the Japan Patent Office for corresponding Japanese Patent Application No. 2016-509687, dated Nov. 14, 2017, with an English translation.

Decision of Refusal issued by the Japan Patent Office for corresponding Japanese Patent Application No. 2016-509687, dated Jun. 19, 2018, with an English translation.

* cited by examiner

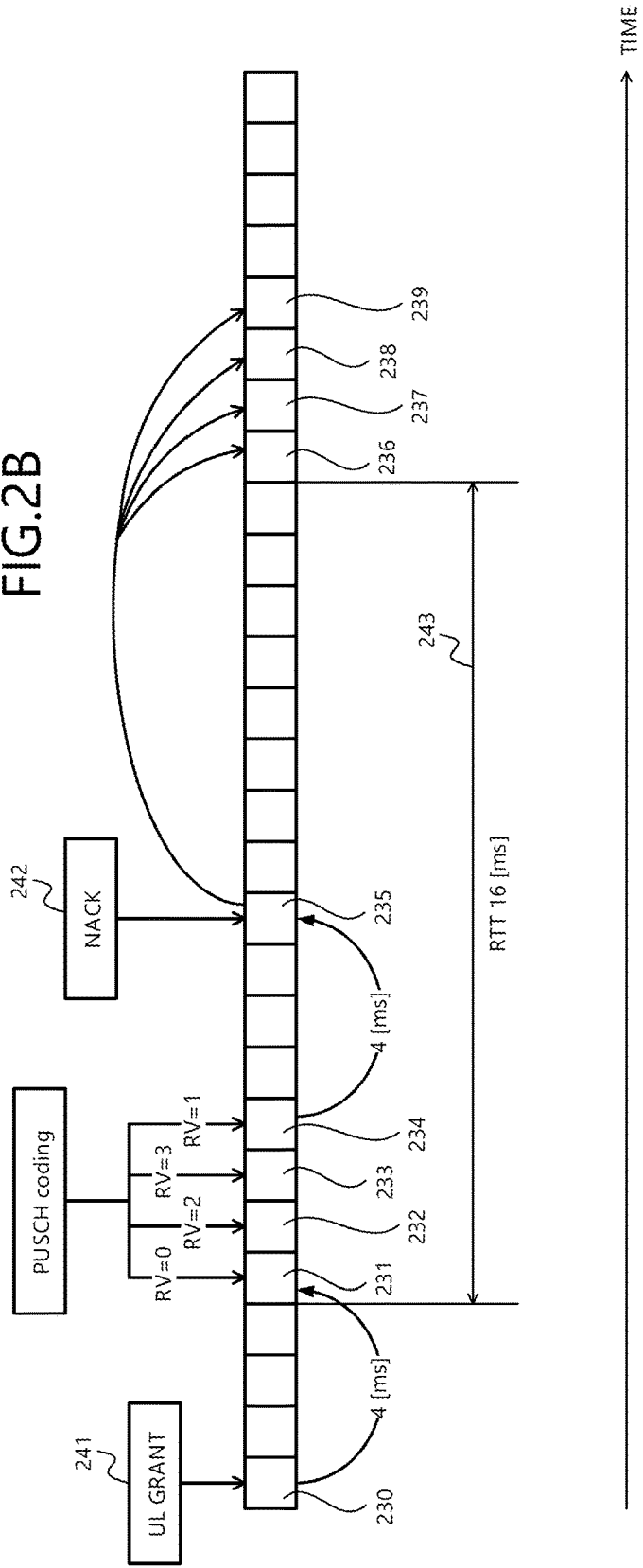

FIG.3

| PDCCH FORMAT | CCE COUNT (AGGREGATION LEVEL) | RESOURCE ELEMENT GROUP COUNT | PDCCH BIT COUNT |
|---|---|---|---|
| 0 | 1 | 9 | 72 |
| 1 | 2 | 18 | 144 |
| 2 | 4 | 36 | 288 |
| 3 | 8 | 72 | 576 |

300

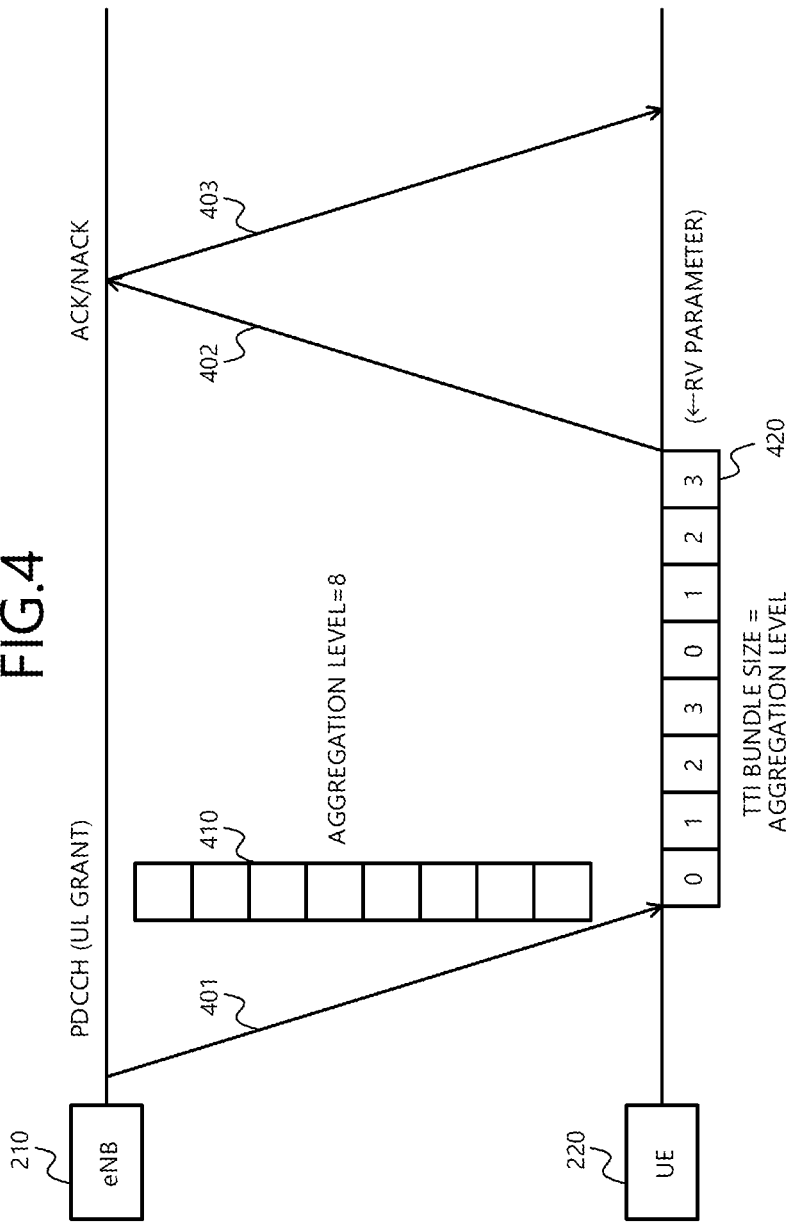

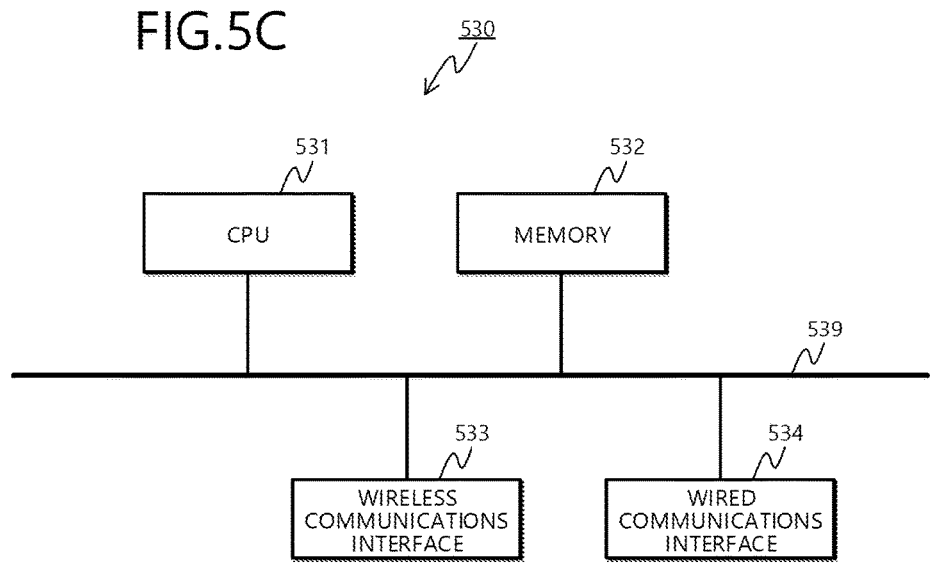

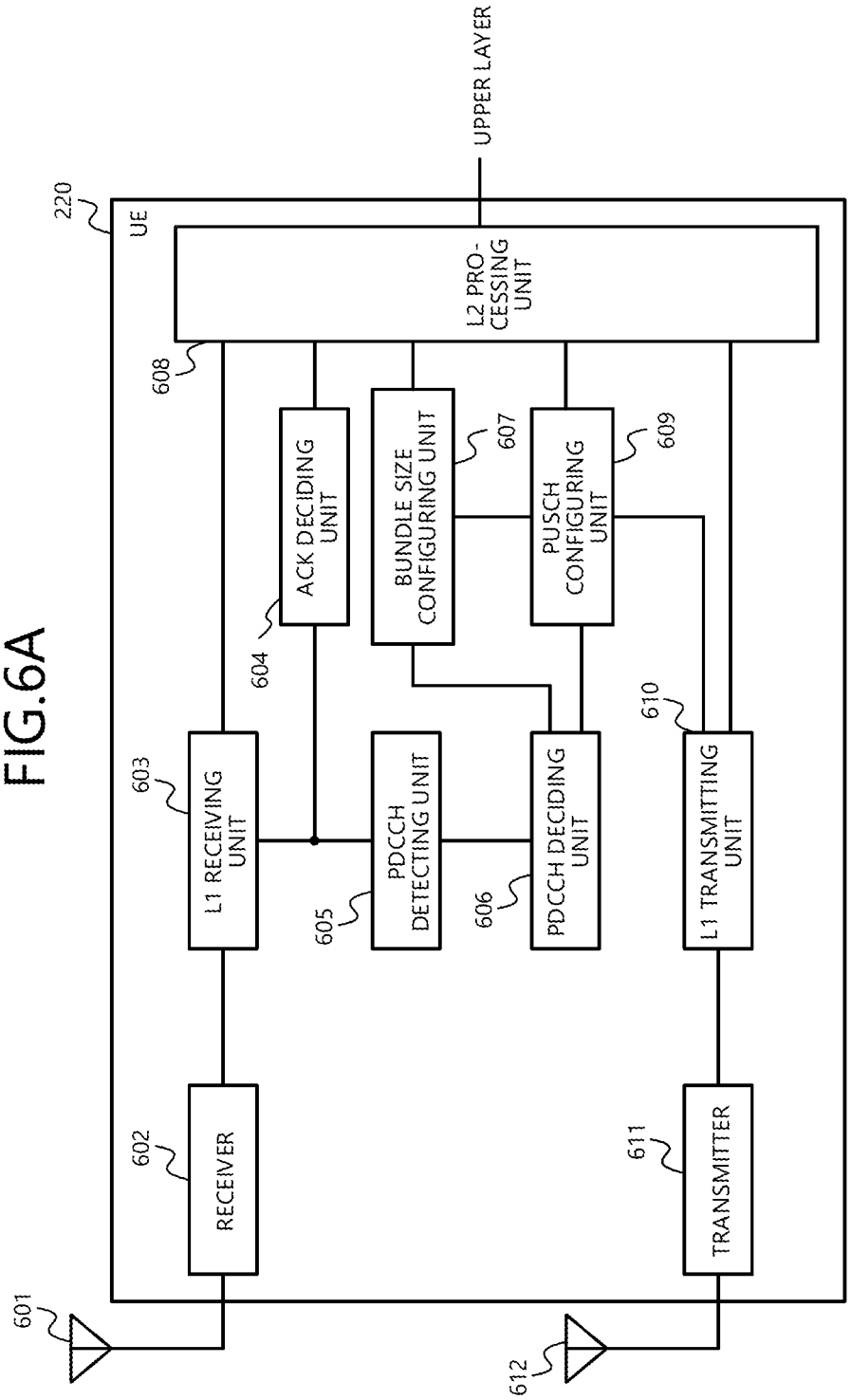

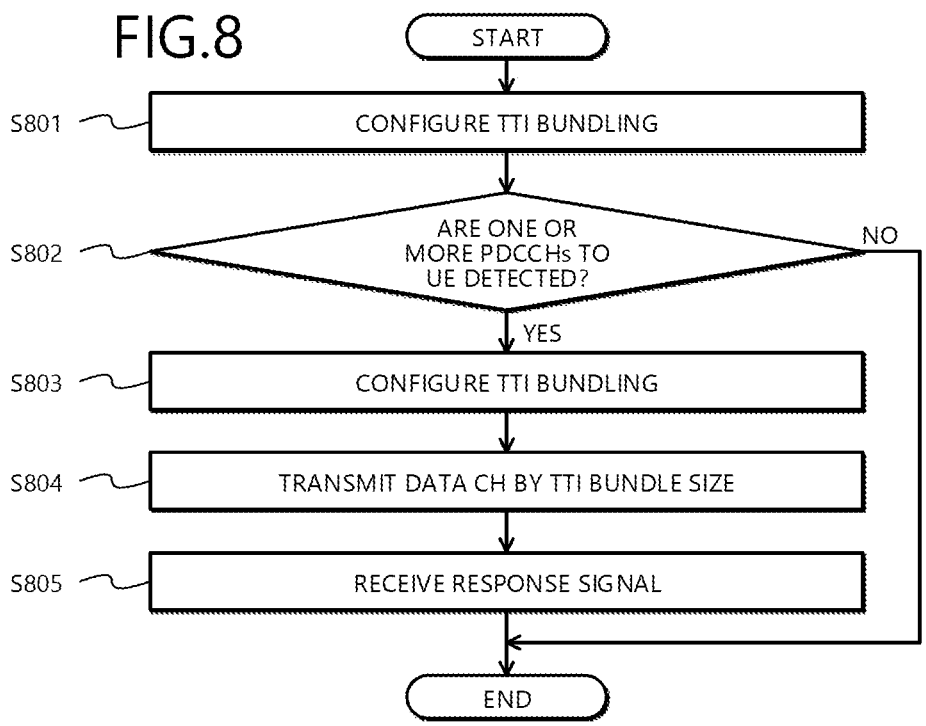

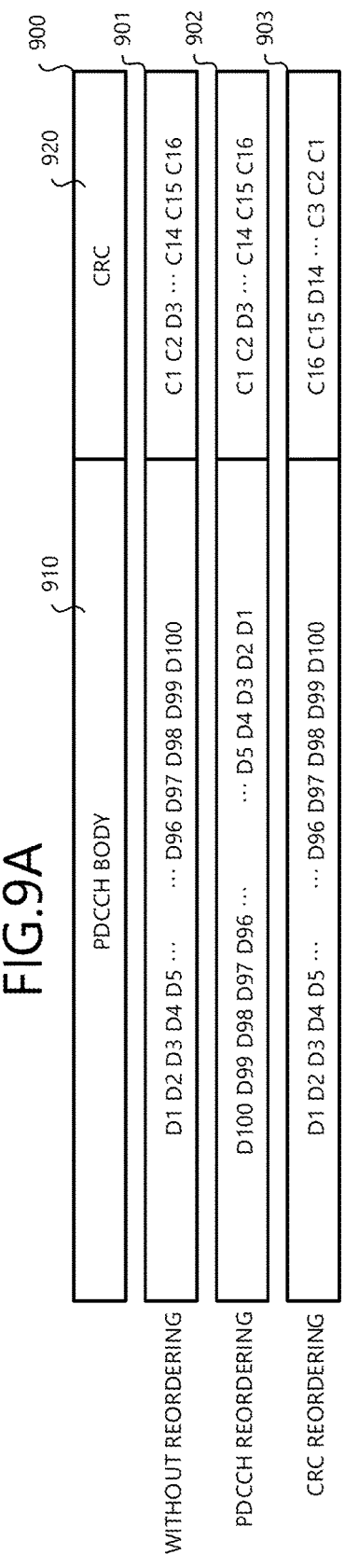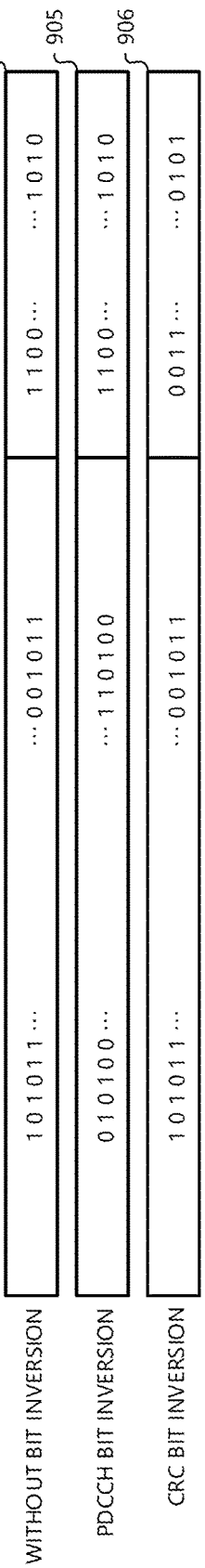

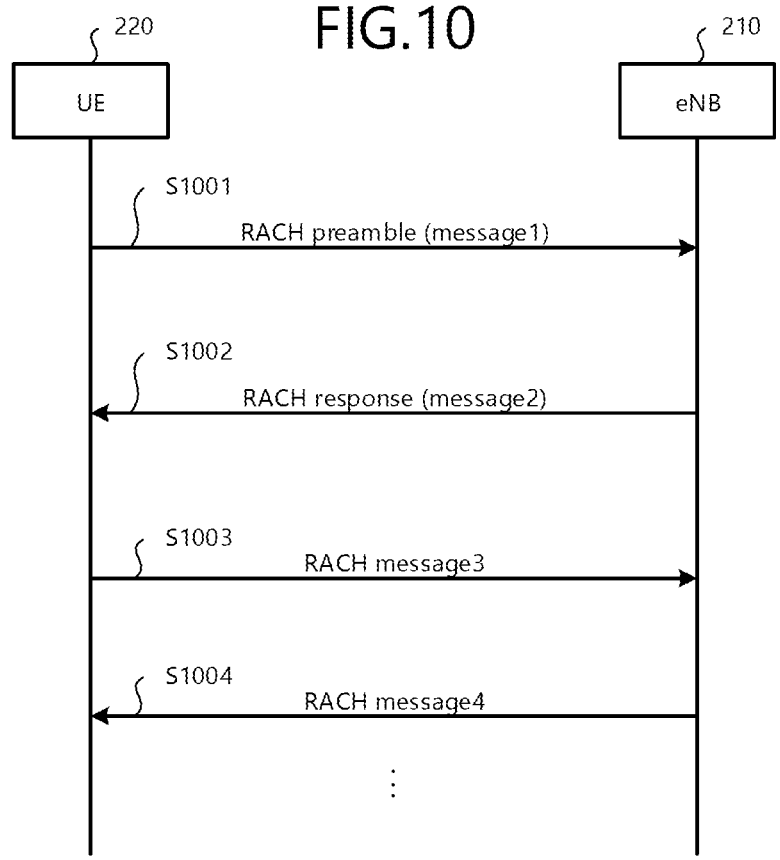

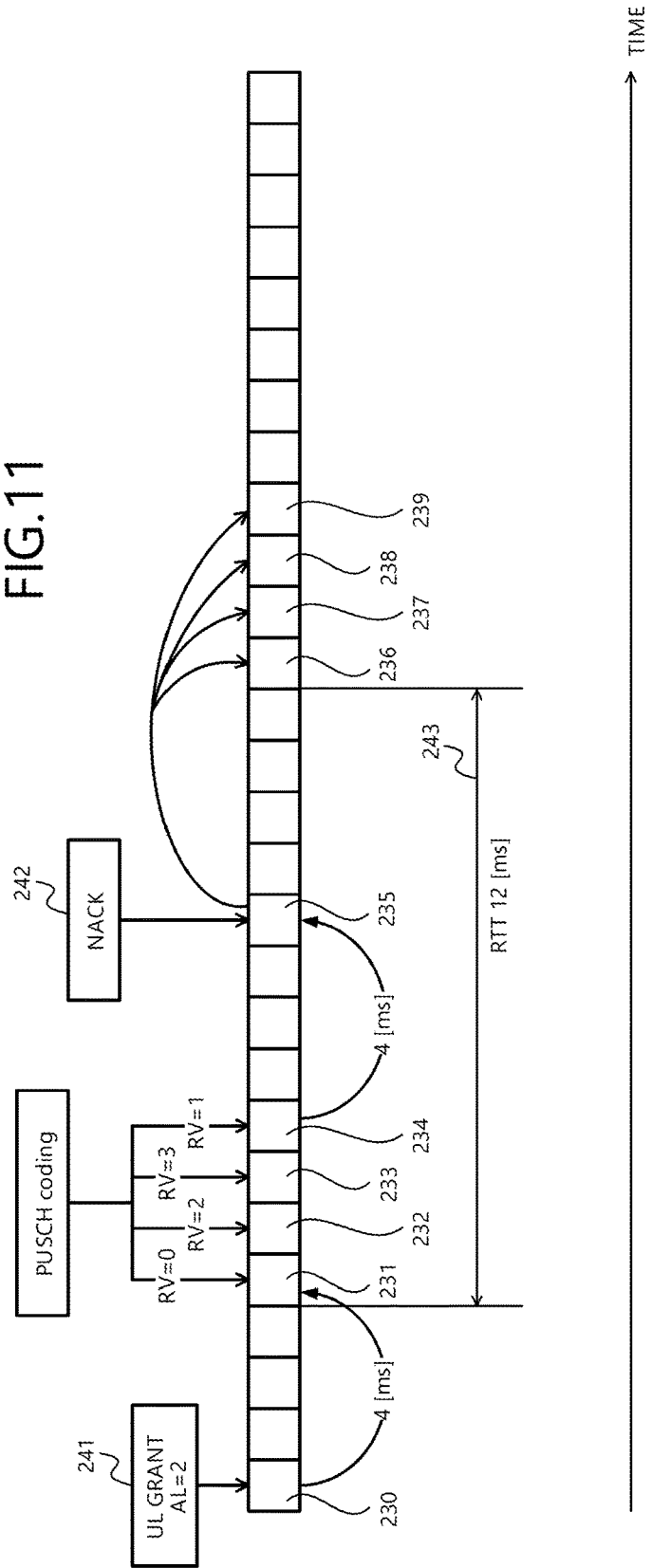

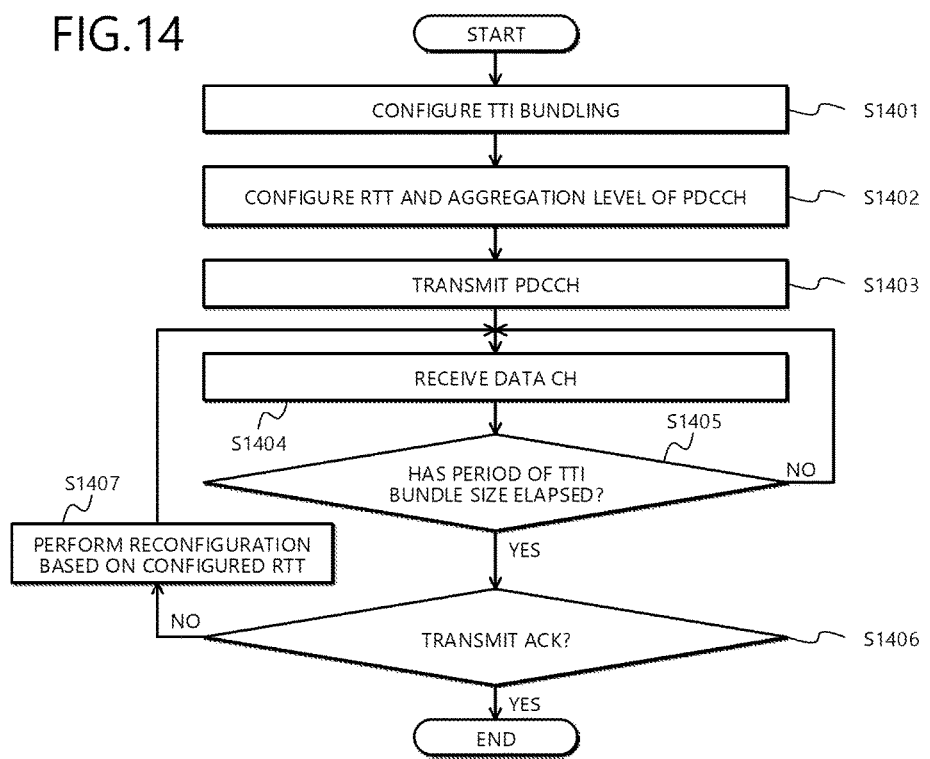

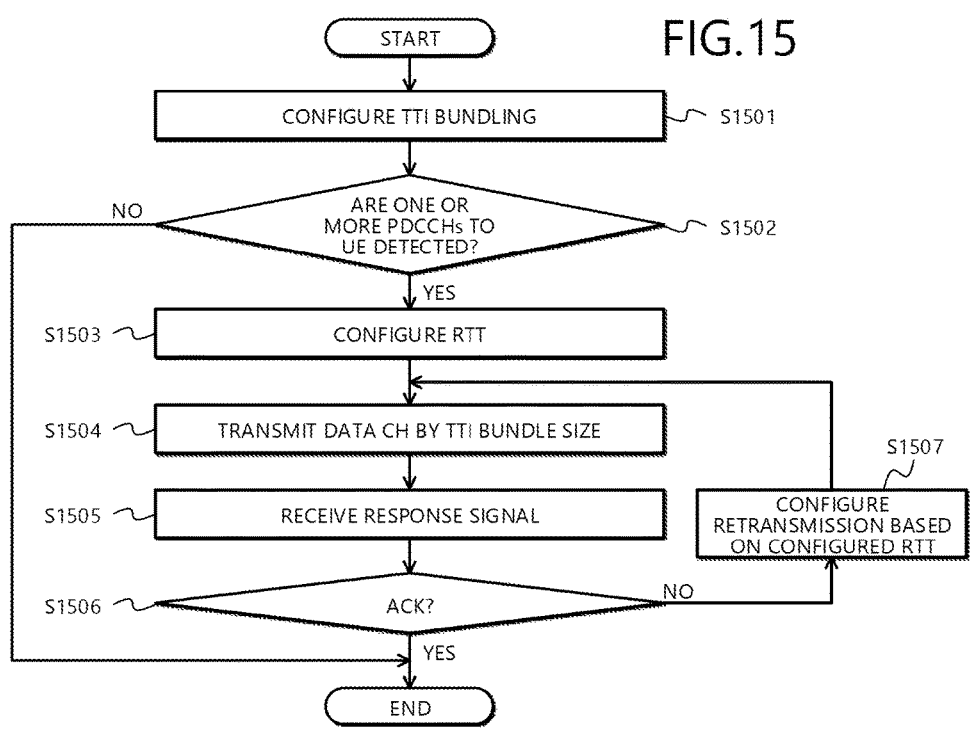

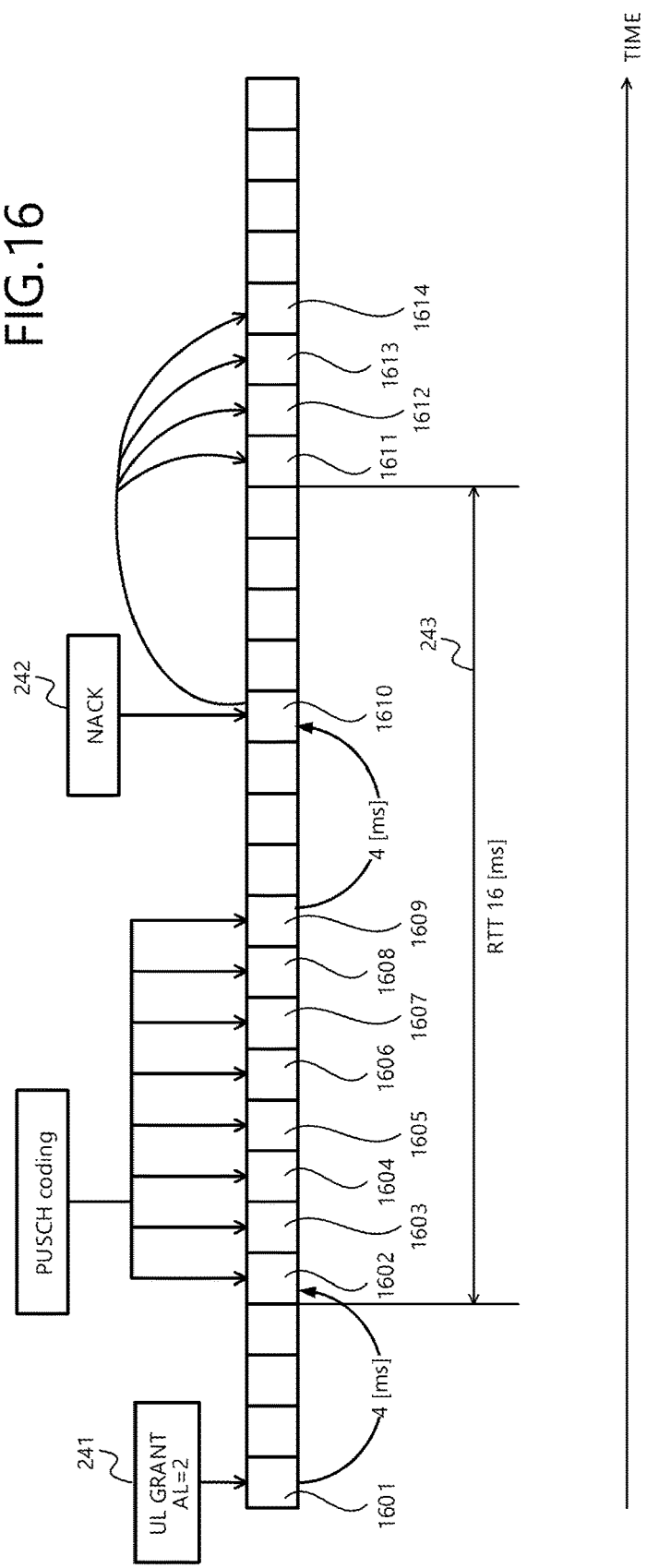

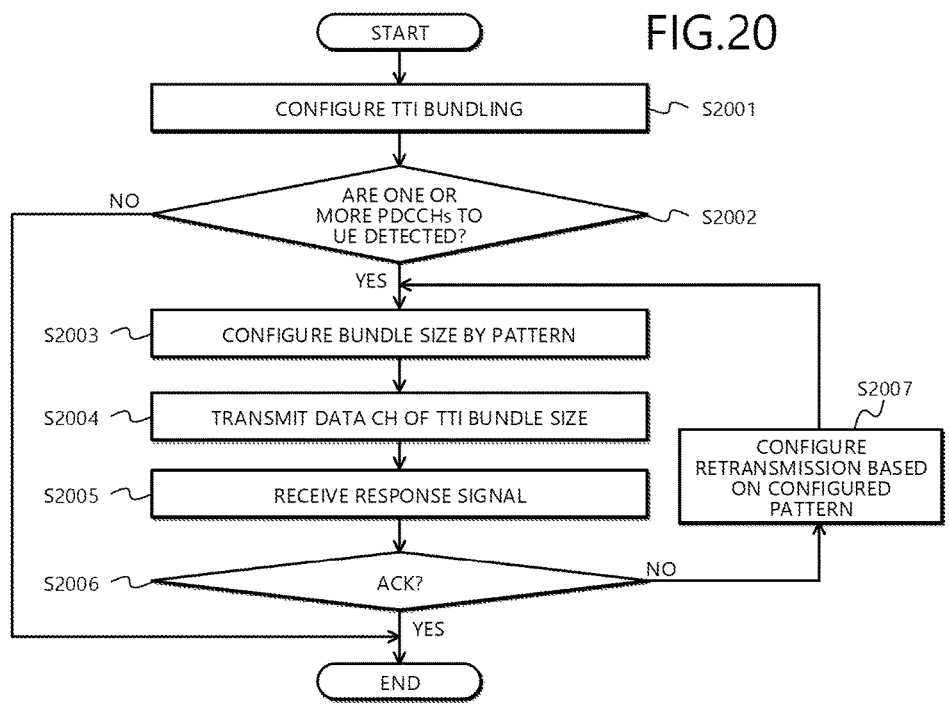

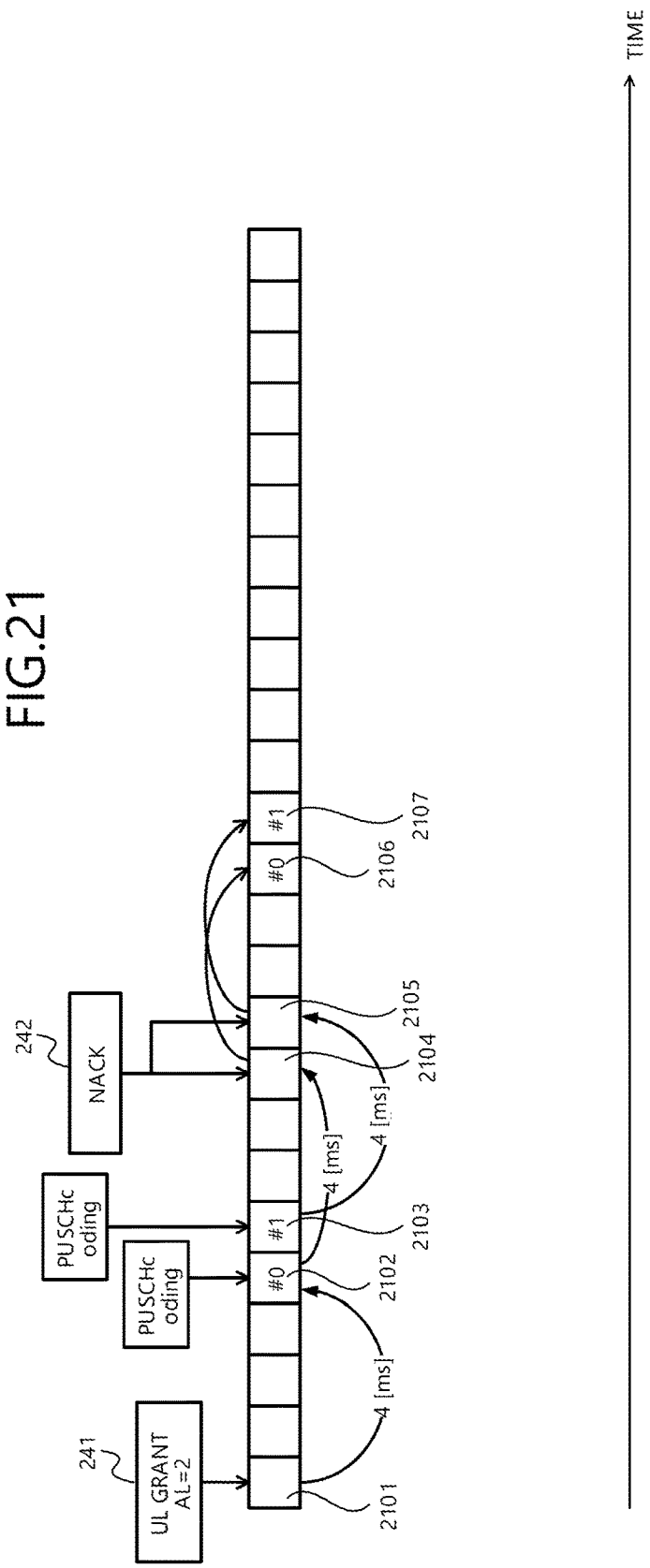

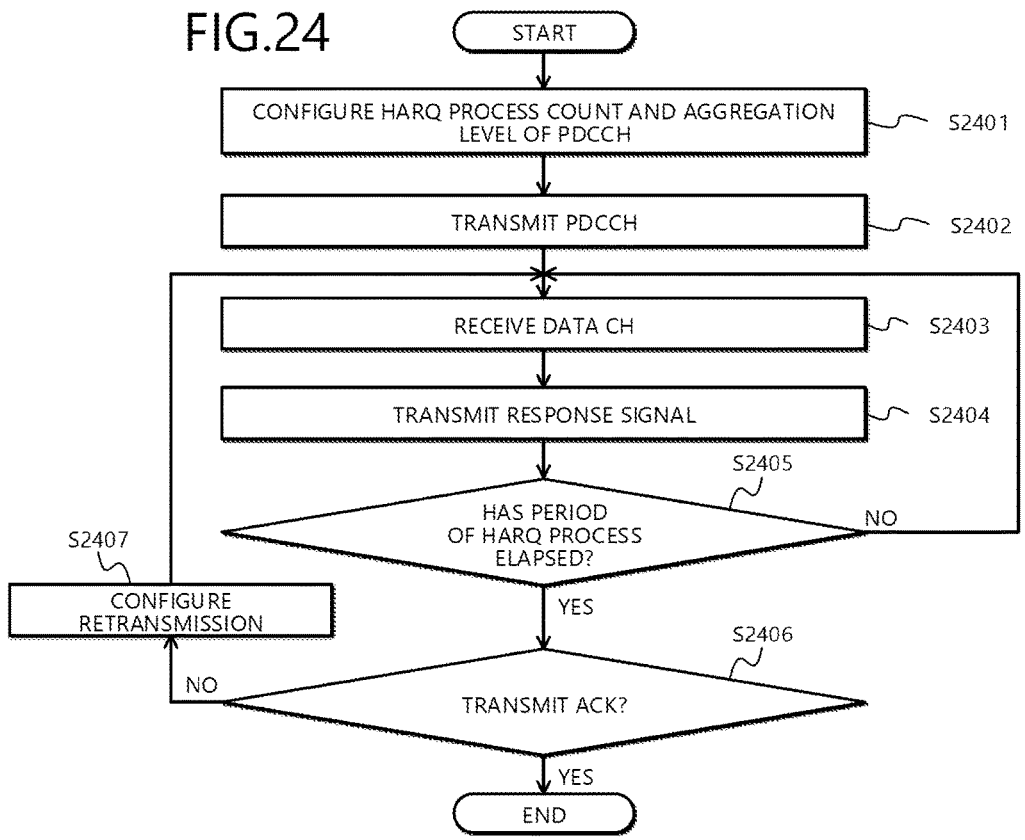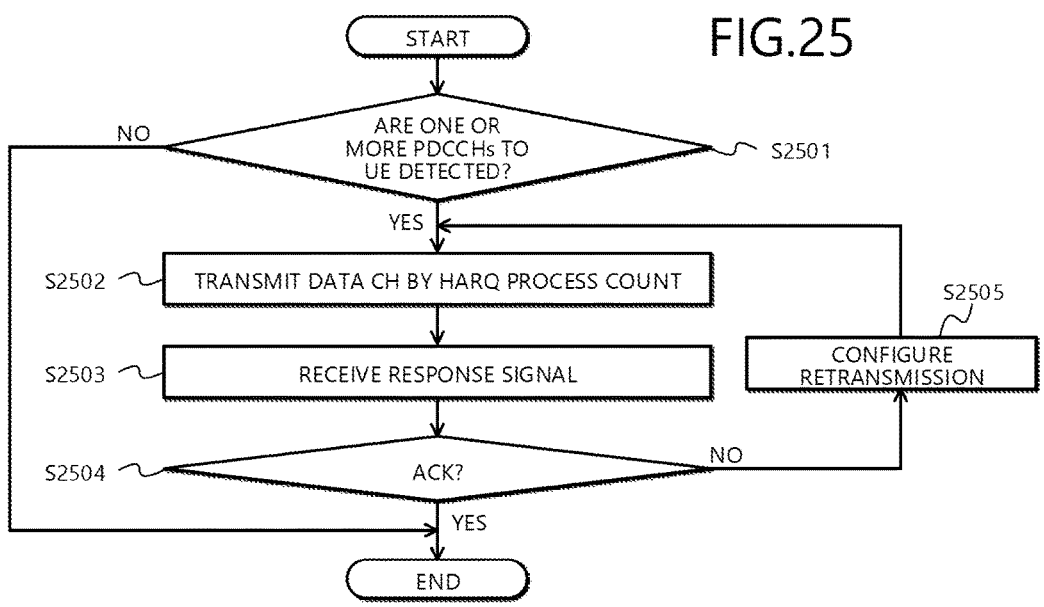

WIRELESS COMMUNICATIONS SYSTEM, TERMINAL, BASE STATION, AND PROCESS METHOD

CROSS REFERENCE TO RELATED APPLICATIONS

This application is a continuation application of International Application PCT/JP2014/058391, filed on Mar. 25, 2014 and designating the U.S., the entire contents of which are incorporated herein by reference.

FIELD

The embodiments discussed herein relate to a wireless communications system, a terminal, a base station, and a process method.

BACKGROUND

Conventionally, use of plural transmission time intervals (TTIs) to transmit information related to a single hybrid automatic repeat request (HARQ) is known (for example, refer to Japanese Laid-Open Patent Publication No. 2013-9401).

SUMMARY

According to an aspect of an embodiment, a wireless communications system includes a terminal configured to adjust a transmission count of consecutive transmissions of a same data to a base station, based on a radio resource count of radio resources assigned to the terminal, among plural radio resources of a control channel received from the base station; and the base station configured to identify the transmission count based on the radio resource count of the radio resources assigned to the terminal among the plural radio resources of the transmitted control channel, and receive the same data consecutively transmitted by the terminal, based on the identified transmission count.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2B is a diagram depicting one example of TTI bundling in uplink under LTE;

FIG. 3 is a diagram depicting one example of aggregation level;

FIG. 4 is a diagram depicting one example of control of TTI bundle size using the aggregation level;

FIG. 5C is a diagram depicting one example of hardware configuration of the eNB;

FIG. 6A is a diagram depicting one example of UE according to the second embodiment;

FIG. 8 is a flowchart of one example of processing by the UE according to the second embodiment;

FIG. 9A is a diagram depicting one example of reordering PDCCH and CRC;

FIG. 9B is a diagram depicting one example of PDCCH bit inversion;

FIG. 10 is a sequence diagram depicting one example of initial access to the eNB by the UE;

FIG. 11 is a diagram depicting one example of changing RTT;

FIG. 14 is a flowchart of one example of processing by the eNB according to the third embodiment;

FIG. 15 is a flowchart of one example of processing by the UE according to the third embodiment;

FIG. 16 is a diagram depicting one example of changing of a TTI bundling pattern;

FIG. 20 is a flowchart of one example of processing by the UE according to the fourth embodiment;

FIG. 21 is a diagram depicting one example of changing HARQ process count;

FIG. 24 is a flowchart of one example of processing by the eNB according to the fifth embodiment; and FIG. 25 is a flowchart of one example of processing by the UE according to the fifth embodiment.

DESCRIPTION OF THE INVENTION

Embodiments of a wireless communications system, a terminal, a base station, and a process method according to the present invention will be described in detail with reference to the accompanying drawings.

Figure 1A:
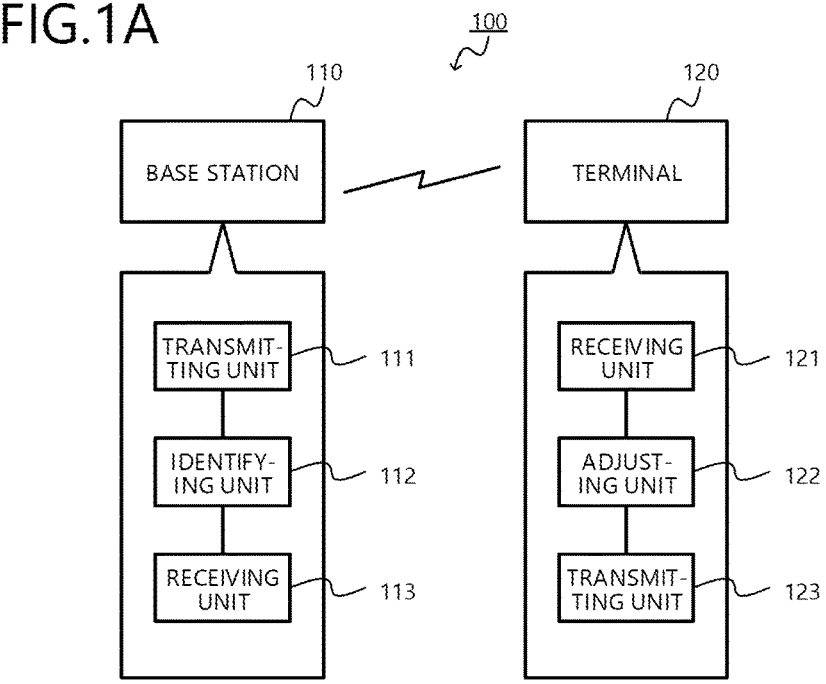
FIG. 1A is a diagram depicting one example of a wireless communications system according to a first embodiment.
Figure 1B:
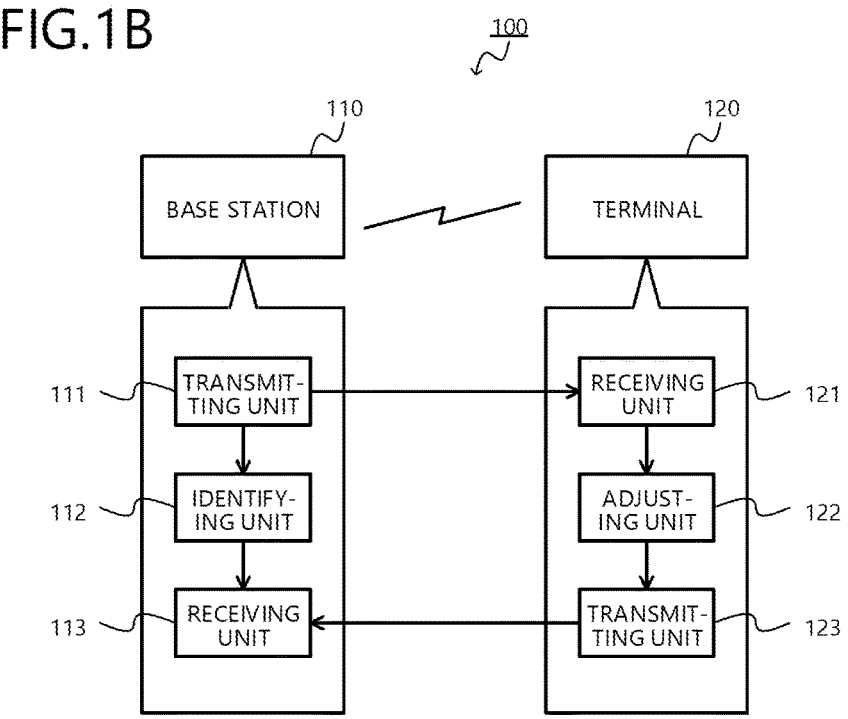
FIG. 1B is a diagram depicting one example of signal flow in the wireless communications system depicted in FIG. 1A.

FIG. 1A is a diagram depicting one example of a wireless communications system according to a first embodiment. FIG. 1B is a diagram depicting one example of signal flow in the wireless communications system depicted in FIG. 1A. As depicted in FIGS. 1A and 1B, a wireless communications system 100 according to the first embodiment includes a base station 110 and a terminal 120.

The terminal 120 transmits wireless signals to the base station 110. Further, the terminal 120 may consecutively transmit the same data to the base station 110. Consecutive transmission of the same data is transmission of plural wireless signals enabling the same data to be demodulated at the base station 110. Therefore, provided the wireless signals are wireless signals enabling the same data to be demodulated, the wireless signals may be mutually different wireless signals.

The base station 110 includes a transmitting unit 111, an identifying unit 112, and a receiving unit 113. The transmitting unit 111 transmits a downlink control channel. The transmitting unit 111 notifies the identifying unit 112 of a radio resource count of the radio resources assigned to the terminal 120 among the radio resources of the transmitted control channel.

The identifying unit 112 identifies a transmission count of consecutive transmissions of the same data by the terminal 120 to the base station 110, based on the radio resource count received from the transmitting unit 111. For example, the identifying unit 112 stores a predetermined correspondence relation of the radio resource count and the transmission count of consecutive transmissions of the same data.

The correspondence relation, for example, may be a relation where the greater the radio resource count is, the greater the transmission count of consecutive transmissions of the same data is. The identifying unit 112 identifies a transmission count corresponding to the notified radio resource count, based on the stored correspondence relation. The identifying unit 112 notifies the receiving unit 113 of the identified transmission count.

The receiving unit 113 receives the same data successively transmitted by the terminal 120, based on the transmission count notified by the identifying unit 112.

The terminal 120 includes a receiving unit 121, an adjusting unit 122, and a transmitting unit 123. The receiving unit 121 receives the control channel transmitted from the base station 110 and outputs the received control channel to the adjusting unit 122.

The adjusting unit 122 decides the radio resource count assigned to the terminal 120 (terminal) among the radio resources of the control channel output from the receiving unit 121. The adjusting unit 122 adjusts the transmission count of consecutive transmissions of the same data by the terminal 120 to the base station 110, based on the decided radio resource count.

For example, the adjusting unit 122 stores a correspondence relation that is the same as the predetermined correspondence relation stored by the base station 110. The adjusting unit 122 adjusts the transmission count of consecutive transmissions of the same data by the terminal 120 to the base station 110, based on stored corresponding correspondence information and the decided radio resource count. Further, the adjusting unit 122 notifies the transmitting unit 123 of the adjusted transmission count.

The transmitting unit 123 transmits the same data to the base station 110, consecutively for the transmission count notified by the adjusting unit 122.

In this manner, the first embodiment enables the transmission count of consecutive transmissions of the same data by the terminal 120 via uplink communication to correspond to the radio resource count assigned to the terminal 120 in the downlink control channel. As a result, the transmission count of consecutive transmissions of the same data by the terminal 120 via uplink communication may be changed without having to give direct notification of the transmission count. Thus, increases in the amount of signaling may be suppressed.

As a first modification example, in place of the transmission count of consecutive transmissions of the same data by the terminal 120, the time until the terminal 120 retransmits data after having transmitted the data to the base station 110 may be associated with the radio resource count in the downlink control channel, assigned to the terminal 120. As a result, the time may be changed without having to give direct notification of the time from the base station 110 to the terminal 120. Thus, increases in the amount of signaling may be suppressed.

In a second modification example, as the transmission count of consecutive transmissions of the same data by the terminal 120, a switching pattern of the transmission count may be associated with the radio resource count in the downlink control channel, assigned to the terminal 120. As a result, the switching pattern may be changed without having to give direct notification of the time from the base station 110 to the terminal 120. Thus, increases in the amount of signaling may be suppressed.

As a third modification example, in place of the transmission count of consecutive transmissions of the same data by the terminal 120, a process count of the number of times a process of consecutively transmitting the same data is performed for the same data by the terminal 120 may be associated with the radio resource count in the downlink control channel, assigned to the terminal 120. As a result, the process count may be changed without having to give direct notification of the time from the base station 110 to the terminal 120. Thus, increases in the amount of signaling may be suppressed.

Figure 2A:
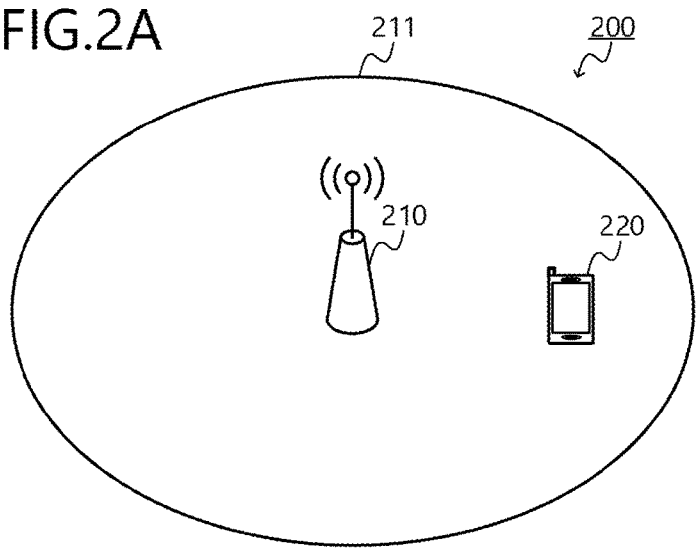
FIG. 2A is a diagram depicting one example of a wireless communications system according to a second embodiment.

FIG. 2A is a diagram depicting one example of a wireless communications system according to a second embodiment. As depicted in FIG. 2A, a wireless communications system 200 according to the second embodiment is a cellular communications system including an eNB 210 and UE 220. The eNB 210 and the UE 220, for example, may wirelessly communicate under the Long Term Evolution (LTE) standard. A cell 211 is a region in which wireless communication with the eNB 210 is possible. The UE 220 is located in the cell 211 and is user equipment (user terminal) capable of wirelessly communicating with the eNB 210.

The wireless communications system 100 depicted in FIGS. 1A and 1B, for example, may be realized by the wireless communications system 200 depicted in FIG. 2A. The base station 110 depicted in FIGS. 1A and 1B, for example, may be realized by the eNB 210 depicted in FIG. 2A. The terminal 120 depicted in FIGS. 1A and 1B, for example, may be realized by the UE 220 depicted in FIG. 2A.

FIG. 2B is a diagram depicting one example of TTI bundling in uplink under LTE. In FIG. 2B, the horizontal axis (subframe) represents time.

An uplink (UL) grant 241 is scheduling information transmitted from the eNB 210 to the UE 220, and is information indicating radio resources assigned to uplink communication of the UE 220 by the eNB 210.

The UE 220 performs TTI bundling of transmitting packets representing the same data, 4 times consecutively at subframes 231 to 234 (4 TTIs), 4 [ms] after a subframe 230 when the UL grant 241 is received. The 4 packets transmitted at the subframes 231 to 234, for example, are transmitted (PUSCH coding) by a Physical Uplink Shared Channel (PUSCH).

The 4 packets transmitted at the subframes 231 to 234 may be mutually different packets provided the 4 packets enable the same data to be decoded on the receiving side. For example, the 4 packets transmitted at the subframes 231 to 234 may be packets respectively having a differing characteristic like redundancy version (RV) of HARQ (RV=0, 2, 3, 1). An example of the characteristics may be a transmission start position of a data block.

A response signal 242 is a response signal transmitted from the eNB 210 to the UE 220 at the subframe 235, 4 [ms] after the subframe 234, in response to packets transmitted at the subframes 231 to 234. In the example depicted in FIG. 2B, the response signal 242 is a NACK (negative-acknowledgement signal) indicating that the data represented by the packets transmitted at the subframes 231 to 234 could not be properly received (decoded).

The UE 220, having received the response signal 242 (NACK), performs TTI bundling of transmitting packets representing the same data as at the subframes 231 to 234, 4 times consecutively at subframes 236 to 239 after an RTT 243 elapses from the subframe 231. The RTT 243 is the time from transmission of the data by the UE 220 until retransmission of the data. In the example depicted in FIG. 2B, the RTT 243 is a round trip time (RTT) of 16 [ms].

FIG. 3 is a diagram depicting one example of aggregation level. The contents of a table 300 depicted in FIG. 3, for example, are defined under Section 6.8.1 of T536.211 of the 3rd Generation Partnership Project (3GPP). The table 300 indicates 4 types (0 to 3) of Physical Downlink Control Channel ((PDCCH) control channel) formats (PDCCH formats).

Each of PDCCH formats includes a CCE count (number of CCEs), resource element group count (number of resource-element groups), and a PDCCH bit count (number of PDCCH bits).

The CCE count is a transmission resource assignment count of the PDCCH (UL grant), called aggregation level. The control channel element (CCE), for example, is a resource unit of 36 symbols.

The eNB 210 selects a CCE count (aggregation level) according to the reception state of the UE 220 and thereby, controls the encoding rate. The reception state of the UE 220, for example, is a Channel Quality Indicator (CQI) reported by the UE 220 to the eNB 210. For example, the eNB 210 selects a greater CCE count (higher aggregation level), the worse the reception state of the UE 220 is. The example depicted in FIG. 3 has 4 aggregation levels, 1, 2, 4, and 8.

FIG. 4 is a diagram depicting one example of control of TTI bundle size using the aggregation level. The eNB 210, for example, similar to Rel-8 of LTE, sets the aggregation level of UL grant by link adaptation and performs transmission 401 of a PDCCH 410 (UL grant) to the UE 220. In the example depicted in FIG. 4, the aggregation level of the PDCCH 410 is 8, i.e., among the CCEs of the PDCCH 410, 8 CCEs are assigned to the UE 220.

The UE 220 performs blind detection of the PDCCH 410, i.e., the UE 220 performs decoding processing on all of the CCEs of the PDCCH 410. The UE 220 is able to decide the aggregation level by the number of CCEs for which decoding was correctly performed.

The UE 220 performs transmission 402 of a data group 420 by TTI bundling that assumes a size corresponding to the decided aggregation level to be the TTI bundle size (TTI bundle count), when TTI bundling with the eNB 210 is enabled.

The data group 420 is a group of the same data consecutively transmitted by TTI bundling by the UE 220. Each numeral of the data group 420 is an RV parameter. The eNB 210 performs transmission 403 of a response signal (ACK/NACK) for the data group 420 received from the UE 220, the response signal (ACK/NACK) being transmitting to the UE 220.

For example, under Alt.6.3 of LTE described later, making TTI bundle size variable in TTI bundling is under consideration. Therefore, for example, TTI bundle size may be associated with aggregation level. As a result, direct notification of the TTI bundle size becomes unnecessary, enabling increases in signaling to be suppressed.

Figure 5A:
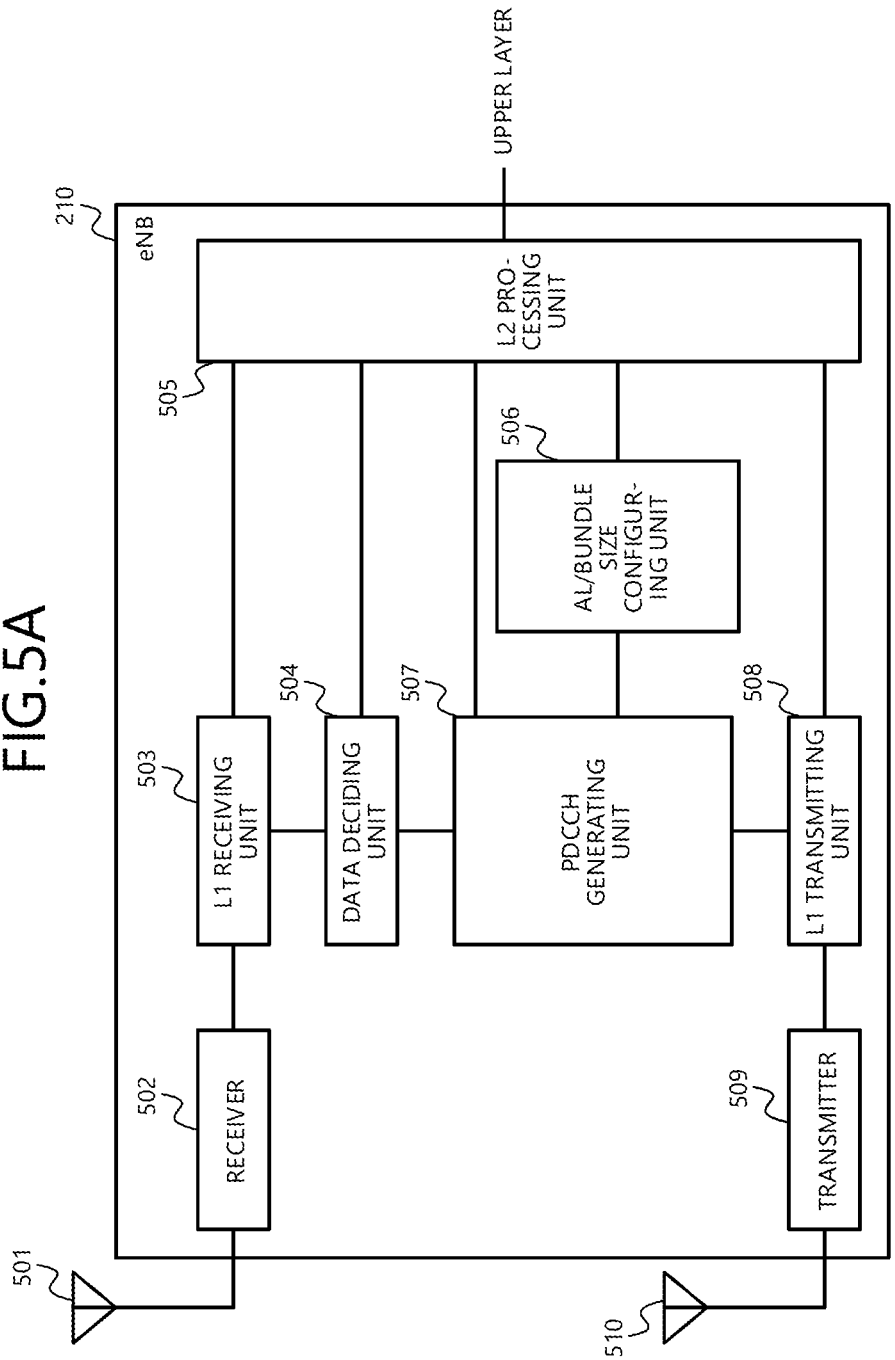
FIG. 5A is a diagram depicting one example of an eNB according to the second embodiment.
Figure 5B:
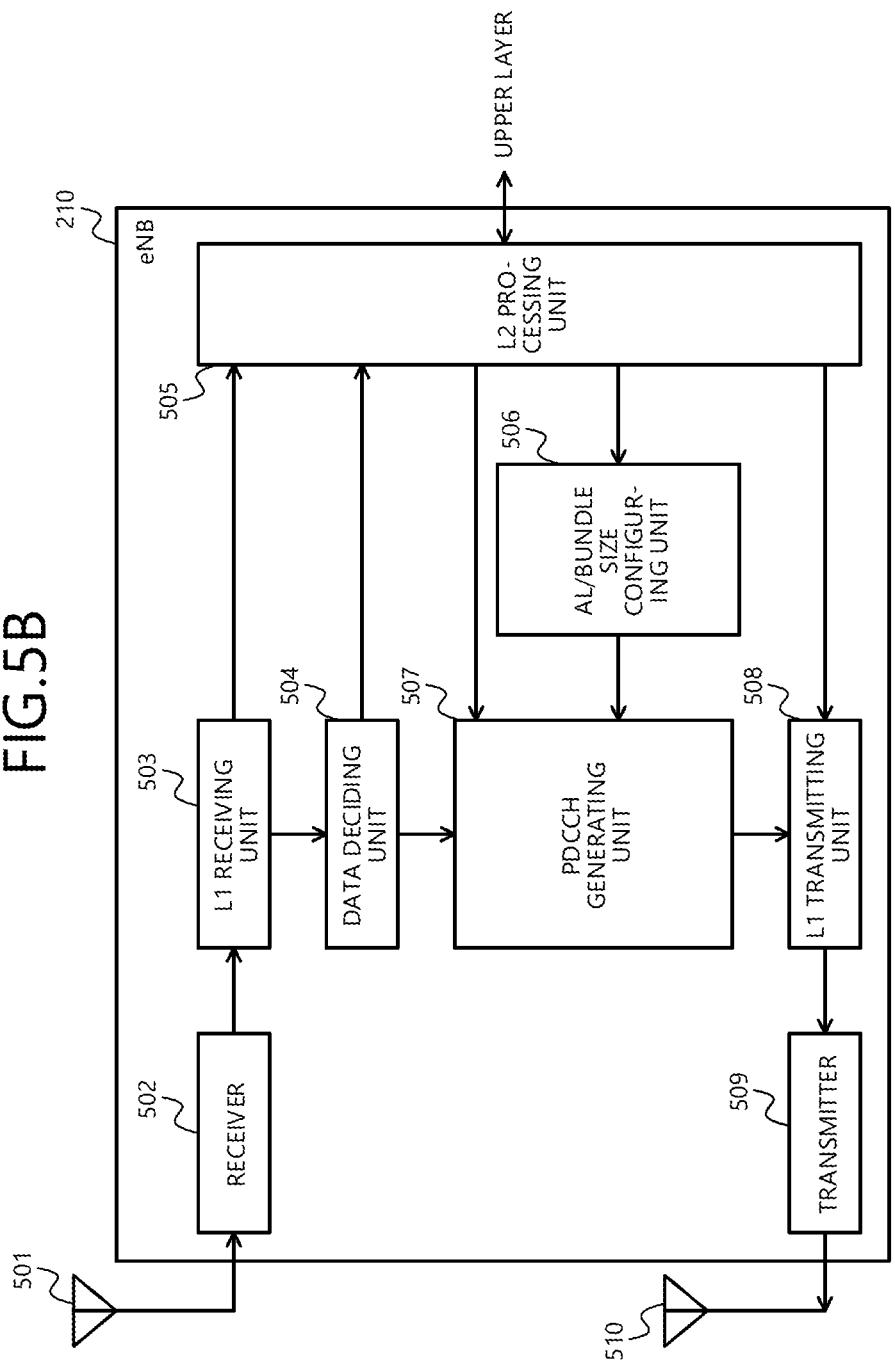
FIG. 5B is a diagram depicting one example of signal flow in the eNB depicted in FIG. 5A.

FIG. 5A is a diagram depicting one example of the eNB according to the second embodiment. FIG. 5B is a diagram depicting one example of signal flow in the eNB depicted in FIG. 5A. As depicted in FIGS. 5A and 5B, the eNB 210 according to the second embodiment includes a receiving antenna 501, a receiver 502, an L1 receiving unit 503, and a data deciding unit 504. Further, the eNB 210 includes an L2 processing unit 505, an AL/bundle size configuring unit 506, a PDCCH generating unit 507, an L1 transmitting unit 508, a transmitter 509, and a transmitting antenna 510.

The receiver 502 receives, via the receiving antenna 501, a signal wirelessly transmitted from the UE 220. The receiver 502 outputs the received signal to the L1 receiving unit 503. The L1 receiving unit 503 performs an L1 (physical layer) reception process on the signal output from the receiver 502 and outputs data obtained from the L1 reception process to the data deciding unit 504 and the L2 processing unit 505.

The data deciding unit 504 performs error detection of the data output from the L1 receiving unit 503 and outputs a result of the error detection (for example, whether an error is present) to the L2 processing unit 505 and the PDCCH generating unit 507.

The L2 processing unit 505 performs an L2 (media access control (MAC) layer) reception process on the data output from the L1 receiving unit 503. Further, the L2 processing unit 505 may perform retransmission control based on the error result output from the data deciding unit 504. For example, the L2 processing unit 505 outputs a response signal (ACK/NACK) corresponding to the error detection result to the L1 transmitting unit 508.

Further, the L2 processing unit 505 performs radio resource assignment for uplink communication from the UE 220 to the eNB 210 and outputs a UL grant indicating the assignment result to the PDCCH generating unit 507.

Further, the L2 processing unit 505 outputs information indicating the reception state of the UE 220 to the AL/bundle size configuring unit 506. The information indicating the reception state of the UE 220, for example, is a CQI from the UE 220 and is included in the data output from the L1 receiving unit 503. The L2 processing unit 505 further outputs to the L1 transmitting unit 508, downlink data that is from the eNB 210 to the UE 220.

The AL/bundle size configuring unit 506 configures the aggregation level of the UE 220, based on the information output from the L2 processing unit 505, indicating the reception state of the UE 220. The AL/bundle size configuring unit 506 notifies the PDCCH generating unit 507 of the configured aggregation level.

Further, the AL/bundle size configuring unit 506 configures a TTI bundle size corresponding to the configured aggregation level. The AL/bundle size configuring unit 506 notifies the PDCCH generating unit 507 of the configured TTI bundle size.

For example, the AL/bundle size configuring unit 506 stores correspondence information indicating a predetermined correspondence relation of aggregation level and TTI bundle size. The correspondence information is information indicating the same correspondence information as the correspondence information stored by the UE 220. The AL/bundle size configuring unit 506 notifies the PDCCH generating unit 507 of the TTI bundle size of the aggregation level configured based on the stored correspondence information.

The PDCCH generating unit 507 generates a PDCCH that is a control signal for downlink from the eNB 210 to the UE 220. The PDCCH generating unit 507 outputs the generated PDCCH to the L1 transmitting unit 508. The PDCCH generating unit 507 further stores to PDCCH, the UL grant output from the L2 processing unit 505. The PDCCH generating unit 507 sets the number of CCEs assigned to the UE 220 in the PDCCH, according to the aggregation level notified by the AL/bundle size configuring unit 506.

The PDCCH generating unit 507 further obtains from the data deciding unit 504, the error detection result for data of the TTI bundle size notified by the AL/bundle size configuring unit 506. The PDCCH generating unit 507 outputs a response signal (ACK/NACK) corresponding to the obtained error detection result to the L1 transmitting unit 508.

The L1 transmitting unit 508 performs an L2 transmission process of the data output from the L2 processing unit 505 and the PDCCH generating unit 507. The L1 transmitting unit 508 outputs to the transmitter 509, a signal (transmission signal) corresponding to the L1 transmission process. The transmitter 509 wirelessly transmits to the UE 220, via the transmitting antenna 510, the signal output from the L1 transmitting unit 508.

The eNB 210 receives data from the UE 220 by recognizing based on the TTI bundle size notified by the AL/bundle size configuring unit 506, the transmission count of transmissions of the same data from the UE 220. The reception process based on TTI bundle size may be performed by the L1 receiving unit 503 and the PDCCH generating unit 507 (L1), or may be performed by the L2 processing unit 505.

The transmitting unit 111 depicted in FIGS. 1A and 1B, for example, may be realized by the PDCCH generating unit 507, the L1 transmitting unit 508, the transmitter 509 and the transmitting antenna 510. For example, the identifying unit 112 depicted in FIGS. 1A and 1B may be realized by, for example, the AL/bundle size configuring unit 506. The receiving unit 113 depicted in FIGS. 1A and 1B may be realized by the receiving antenna 501, the receiver 502, and the L1 receiving unit 503.

FIG. 5C is a diagram depicting one example of hardware configuration of the eNB. The eNB 210 depicted in FIGS. 5A and 5B, for example, may be realized by a communications apparatus 530 depicted in FIG. 5C. The communications apparatus 530 includes a CPU 531, memory 532, a wireless communications interface 533, and a wired communications interface 534. The CPU 531, the memory 532, the wireless communications interface 533, and the wired communications interface 534 are connected by a bus 539.

The CPU (central processing unit) 531 governs overall control of the communications apparatus 530. The memory 532 includes, for example, main memory and auxiliary memory. The main memory, for example, is random access memory (RAM) and is used as a work area of the CPU 531. The auxiliary memory, for example, is non-volatile memory such as a magnetic disk, an optical disk, and flash memory. The auxiliary memory stores various types of programs operating the communications apparatus 530. A program stored in the auxiliary memory is loaded onto the main memory and executed by the CPU 531.

The wireless communications interface 533 is communications interface that wirelessly communicates with an external device (for example, the UE 220) of the communications apparatus 530. The wireless communications interface 533 is controlled by the CPU 531.

The wired communications interface 534 is a communications interface that performs wired communication with an external device (for example, higher apparatus) of the communications apparatus 530. The wired communications interface 534 is controlled by the CPU 531.

The receiving antenna 501, the receiver 502, the transmitter 509, and the transmitting antenna 510 depicted in FIGS. 5A and 5B, for example, may be realized by the wireless communications interface 533. The L1 receiving unit 503, the data deciding unit 504, the L2 processing unit 505, the AL/bundle size configuring unit 506, the PDCCH generating unit 507, and the L1 transmitting unit 508 depicted in FIGS. 5A and 5B, for example, may be realized by the CPU 531 and the memory 532.

Figure 6B:
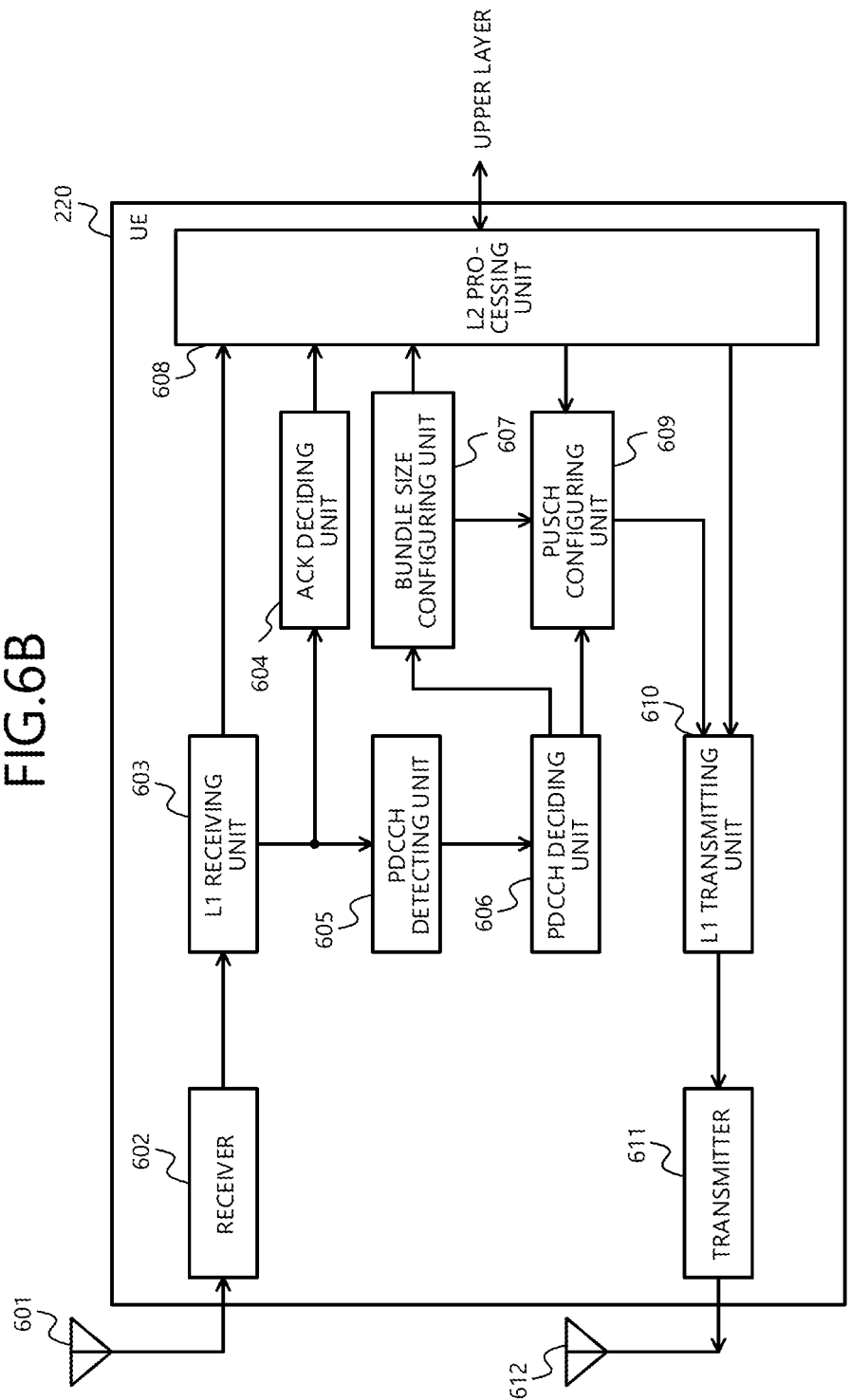
FIG. 6B is a diagram depicting one example of signal flow in the UE depicted in FIG. 6A.

FIG. 6A is a diagram depicting one example of UE according to the second embodiment. FIG. 6B is a diagram depicting one example of signal flow in the UE depicted in FIG. 6A. As depicted in FIGS. 6A and 6B, the UE 220 according to the second embodiment includes a receiving antenna 601, a receiver 602, an L1 receiving unit 603, an ACK deciding unit 604, a PDCCH detecting unit 605, a PDCCH deciding unit 606, and a bundle size configuring unit 60. Further, the UE 220 includes an L2 processing unit 608, a PUSCH configuring unit 609, an L1 transmitting unit 610, a transmitter 611, and a transmitting antenna 612.

The receiver 602 receives, via the receiving antenna 601, a signal wirelessly transmitted from the eNB 210. The receiver 602 outputs the received signal to the L1 receiving unit 603. The L1 receiving unit 603 performs an L1 (physical layer) reception process on the signal output from the receiver 602. The L1 receiving unit 603 outputs data obtained from the L1 reception process to the ACK deciding unit 604, the PDCCH detecting unit 605, and the L2 processing unit 608.

The ACK deciding unit 604 performs an ACK decision with respect to the data output from the L1 receiving unit 603 and outputs a result of the ACK decision to the L2 processing unit 608.

The PDCCH detecting unit 605 detects a PDCCH included in the data output from the L1 receiving unit 603. For example, the PDCCH detecting unit 605 performs blind detection of performing decoding processing on all CCEs of the PDCCH included in the data output from the L1 receiving unit 603. The PDCCH detecting unit 605 outputs to the PDCCH deciding unit 606, a PDCCH correctly decoded by the blind detection.

The PDCCH deciding unit 606 notifies the bundle size configuring unit 607 of an aggregation level based on the number of PDCCHs output from the PDCCH detecting unit 605. Further, the PDCCH deciding unit 606 outputs to the PUSCH configuring unit 609, a UL grant stored in the PDCCH output from the PDCCH detecting unit 605.

The bundle size configuring unit 607 notifies the PUSCH configuring unit 609 of the TTI bundle size corresponding to the aggregation level notified by the PDCCH deciding unit 606. For example, the bundle size configuring unit 607 stores correspondence information indicating a predetermined correspondence relation between aggregation level and TTI bundle size. The correspondence information indicates the same correspondence information as the correspondence information stored by the eNB 210. Based on the correspondence information, the bundle size configuring unit 607 notifies the L2 processing unit 608 and the PUSCH configuring unit 609 of the TTI bundle size corresponding to the aggregation level notified by the PDCCH deciding unit 606.

The L2 processing unit 608 performs an L2 reception process on the data output from the L1 receiving unit 603. Further, the L2 processing unit 608 may perform retransmission control based on the result of the ACK decision output from the ACK deciding unit 604. For example, the L2 processing unit 608 outputs to the L1 transmitting unit 610, a response signal (ACK/NACK) corresponding to the error detection result.

The L2 processing unit 608 outputs to the L1 transmitting unit 610, information indicating the reception state of the UE 220. Information indicating the reception state of the UE 220, for example, is data output from the L1 receiving unit 603 or a CQI based on the result of the ACK decision output from the ACK deciding unit 604. The L2 processing unit 608 outputs to the PUSCH configuring unit 609, uplink data from the UE 220 to the eNB 210.

The PUSCH configuring unit 609 configures the PUSCH included in the uplink data output from the L2 processing unit 608 and outputs the configured PUSCH to the L1 transmitting unit 610. The PUSCH configuring unit 609 assigns the PUSCH to the radio resources indicated by the UL grant output from the PDCCH deciding unit 606. The PUSCH configuring unit 609 configures the PUSCH so that the same uplink data is transmitted consecutively for the transmission count of the TTI bundle size notified by the bundle size configuring unit 607.

The L1 transmitting unit 610 performs an L1 transmission process on the data output from the L2 processing unit 608 and the PUSCH configuring unit 609. The L1 transmitting unit 610 outputs to the transmitter 611, a signal (transmission signal) corresponding to the L1 transmission process. The transmitter 611 wirelessly transmits to the eNB 210, via the transmitting antenna 612, the data output from the L1 transmitting unit 610.

The receiving unit 121 depicted in FIGS. 1A and 1B, for example, may be realized by the receiving antenna 601, the receiver 602, and the L1 receiving unit 603. The adjusting unit 122 depicted in FIGS. 1A and 1B, for example, may be realized by the PDCCH detecting unit 605, the PDCCH deciding unit 606, and the bundle size configuring unit 607. The transmitting unit 123 depicted in FIGS. 1A and 1B, for example, may be realized by the PUSCH configuring unit 609, the L1 transmitting unit 610, the transmitter 611, and the transmitting antenna 612.

Figure 6C:
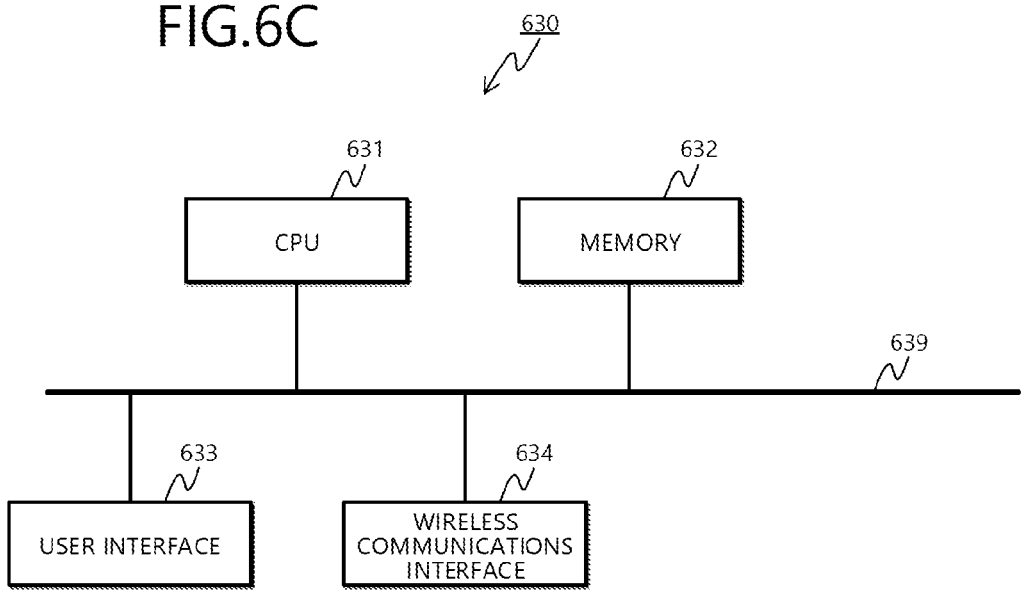
FIG. 6C is a diagram depicting one example of hardware configuration of the UE.

FIG. 6C is a diagram depicting one example of hardware configuration of the UE. The UE 220 depicted in FIGS. 6A and 6B, for example, is realized by a communications apparatus 630 depicted in FIG. 6C. The communications apparatus 630 includes a CPU 631, memory 632, a user interface 633, and a wireless communications interface 634. The CPU 631, the memory 632, the user interface 633, and the wireless communications interface 634 are connected by a bus 639.

The CPU 631 governs overall control of the communications apparatus 630. The memory 632, for example, includes main memory and auxiliary memory. The main memory, for example, is RAM. The main memory is used as a work area of the CPU 631. The auxiliary memory, for example, is non-volatile memory such as a magnetic disk, flash memory, or the like. The auxiliary memory stores various types of programs operating the communications apparatus 630. A program stored in the auxiliary memory is loaded onto the main memory and executed by the CPU 631.

The user interface 633, for example, includes an input device that receives operation input from the user, an output device that outputs information to the user, etc. The input device, for example, may be realized by keys (for example, keyboard), a remote controller, and the like. The output device, for example, may be realized by a display, a speaker, and the like. Further, the input device and the output device may be realized by a touch panel, or the like. The user interface 633 is controlled by the CPU 631.

The wireless communications interface 634 is a communications interface that wirelessly communicates with an external device (for example, the eNB 210) of the communications apparatus 630. The wireless communications interface 634 is controlled by the CPU 631.

The receiving antenna 601, the receiver 602, the transmitter 611, and the transmitting antenna 612 depicted in FIGS. 6A and 6B, for example, may be realized by the wireless communications interface 634. The L1 receiving unit 603, the ACK deciding unit 604, the PDCCH detecting unit 605, the PDCCH deciding unit 606, the bundle size configuring unit 607, and the L2 processing unit 608 depicted in FIGS. 6A and 6B, for example, may be realized by the CPU 631 and the memory 632. The PUSCH configuring unit 609 and the L1 transmitting unit 610 depicted in FIGS. 6A and 6B, for example, may be realized by the CPU 631 and the memory 632.

Figure 7:
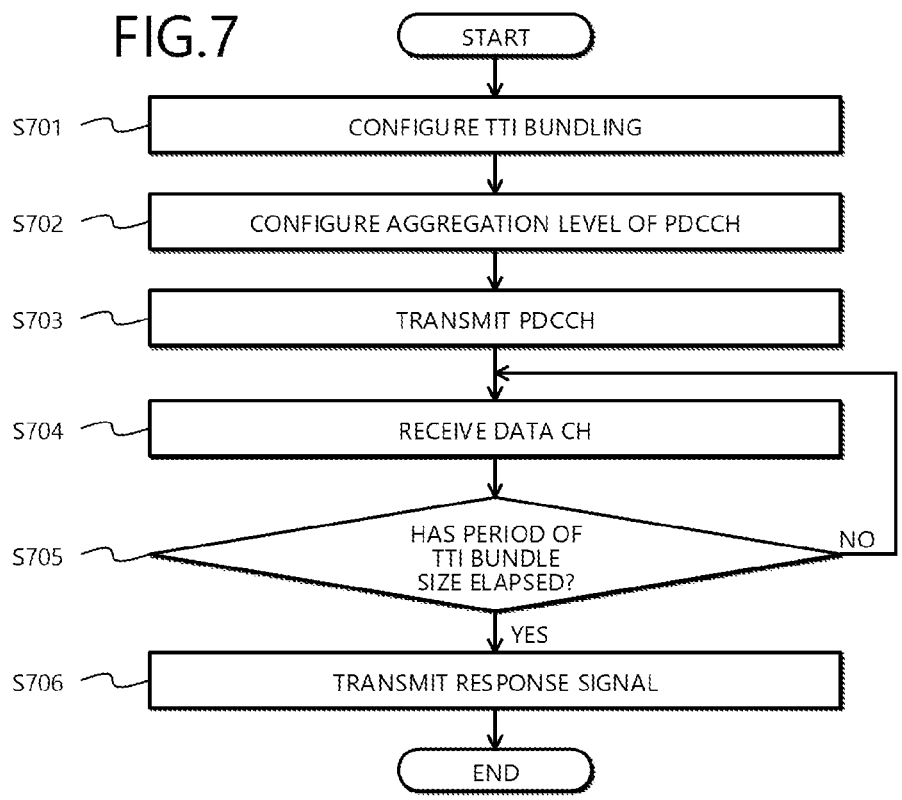
FIG. 7 is a flowchart of one example of processing by the eNB according to the second embodiment.

FIG. 7 is a flowchart of one example of processing by the eNB according to the second embodiment. The eNB 210 according to the second embodiment, for example, executes the steps depicted in FIG. 7. The eNB 210 configures (enables) TTI bundling with the UE 220 (step S701). The configuration at step S701, for example, may be performed based on radio link control (RLC) layer communication with the UE 220.

The eNB 210 configures the aggregation level of the PDCCH from the eNB 210 to the UE 220 (step S702). For example, the eNB 210 configures the aggregation level of the PDCCH based on the CQI reported by the UE 220. The eNB 210 transmits the PDCCH to the UE 220 by the aggregation level configured at step S702 (step S703).

The eNB 210 receives a data CH by TTI bundling from the UE 220 (step S704). At step S704, the eNB 210, for example, receives the data CH at the radio resource indicated by the UL grant stored in the PDCCH transmitted at step S703. The data CH from the UE 220, for example, is a PUSCH.

The eNB 210 determines whether a period of the TTI bundle size has elapsed since the reception of the data CH started at step S704 (step S705). The TTI bundle size is the TTI bundle size corresponding to the aggregation level configured at step S702. If a period of the TTI bundle size has not elapsed (step S705: NO), the eNB 210 returns to step S704.

At step S705, if a period of the TTI bundle size has elapsed (step S705: YES), the eNB 210 transmits a response signal for the UE 220 to the UE 220 (step S706), and ends the series of operations. The response signal transmitted at step S706 is a response signal (ACK/NACK) corresponding to the error detection result of the data CH received at step S704.

FIG. 8 is a flowchart of one example of processing by the UE according to the second embodiment. The UE 220 according to the second embodiment, for example, executes the steps depicted in FIG. 8. The UE 220 configures (enables) TTI bundling with the eNB 210 (step S801). The configuration at step S801, for example, may be performed based on RLC layer communication with the eNB 210.

The UE 220 performs blind detection of the PDCCH transmitted from the eNB 210 and determines if one or more PDCCHs to the UE 220 are detected (step S802). If one or more PDCCHs to the UE 220 are not detected (step S802: NO), the UE 220 ends the series of operations.

At step S802, if one or more PDCCHs to the UE 220 are detected (step S802: YES), the UE 220 configures the TTI bundle size corresponding to the number of detected PDCCHs to the UE 220 (aggregation level) (step S803).

The UE 220 transmits the data CH to the eNB 210, by the TTI bundle size configured at step S803 (step S804). At step S804, the UE 220, for example, transmits the data CH at the radio resource indicated by the UL grant stored in a detected PDCCH to the UE 220. The UE 220 receives a response signal for the data CH transmitted at step S804 (step S805), and ends the series of operations.

The TTI bundle size corresponding to aggregation level, for example, may be a TTI bundle size of the same value as the aggregation level. For example, when the aggregation level is 2, the eNB 210 and the UE 220 use 2 TTIs as the TTI bundle size.

The TTI bundle size corresponding to the aggregation level may be a TTI bundle size of a value obtained by multiplying the aggregation level by a predetermined value Nx, i.e., TTI bundle size=Nx×aggregation level. For example, when predetermined value Nx=2 and the aggregation level is 4, TTI bundle size may be configured to be 2×4=8.

The predetermined value Nx, for example, may be pre-stored by the eNB 210 and the UE 220. Alternatively, the predetermined value Nx, for example, may be shared by upper layer (for example, RLC layer) communication between the eNB 210 and the UE 220.

The predetermined value Nx may change dynamically according to the wireless communications environment between the eNB 210 and the UE 220. For example, the eNB 210 may set the predetermined value Nx to be a difference (for example, a ratio or difference) of a value indicating the communication quality of uplink communication from the UE 220 to the eNB 210 and a value of communication quality of downlink communication from the eNB 210 to the UE 220.

As the value indicating the communication quality of uplink communication, for example, a CQI measured by the eNB 210 based on a wireless signal from the UE 220 may be used. As the value indicating the communication quality of downlink communication, for example, a CQI measured by the UE 220 based on a wireless signal from the eNB 210 and transmitted by the UE 220 to the eNB 210 may be used.

Although a case where the TTI bundle size is a value obtained by multiplying the aggregation level by a predetermined value Nx, the relation of aggregation level and TTI bundle size is not limited hereto. For example, the TTI bundle size may be a value obtained by various calculations such as addition of, subtraction of, division by the predetermined value Nx with respect to the aggregation level.

A correspondence table indicating the correspondence relation of the aggregation level and the TTI bundle size may be stored by the eNB 210 and the UE 220. In this case, the eNB 210 and the UE 220 select a TTI bundle size based on the aggregation level and the correspondence table. Further, in addition to the aggregation level, a TTI bundle size may be selected with consideration of a coefficient related to transmission power.

In this manner, the eNB 210 and the UE 220 store the same correspondence relation (for example, Nx or correspondence table) of the aggregation level and the TTI bundle size. As a result, the TTI bundle size may be controlled according to the aggregation level configured by the eNB 210, without requiring direct notification of the TTI bundle size from the eNB 210 to the UE 220.

Notification of TTI bundle size based on PDCCH reordering will be described. FIG. 9A is a diagram depicting one example of reordering PDCCH and CRC. A PDCCH 900 depicted in FIG. 9A is a PDCCH transmitted by the eNB 210 to the UE 220. A PDCCH body 910 is a body portion of the PDCCH 900. A CRC 920 is a redundant portion added to the PDCCH body 910. In other words, the CRC 920 is a cyclic redundancy check (CRC) calculated based on the PDCCH body 910.

A reordering state 901 is a state of the PDCCH 900 without reordering. Reordering is a process of reversing the arrangement of a data string. A reordering state 902 is a state of the PDCCH 900 when reordering of the PDCCH body 910 has been performed. A reordering state 903 is a state of the PDCCH 900 in which reordering of the CRC 920 has been performed.

The eNB 210 selects one of the reordering states 901 to 903 and transmits the PDCCH 900 to the UE 220. Further, the eNB 210 notifies the UE 220 of a TTI bundle size by a combination of the reordering state 901 to 903 and the aggregation level.

Meanwhile, the UE 220, in the blind detection, performs CRC processes respectively corresponding to the reordering states 901 to 903 and identifies among the reordering states 901 to 903, an error-free reordering state. The UE 220 uses a TTI bundle size corresponding to the combination of the identified reordering state and aggregation level and transmits a data CH to the eNB 210.

In this case, the eNB 210 and the UE 220, for example, share correspondence information indicating the correspondence relation of the TTI bundle size and the combination of the aggregation level and the reordering state 901 to 903.

As a result, the UE 220 may be notified of the TTI bundle size by the combination of the aggregation level and the reordering states 901 to 903, enabling more flexible control of the TTI bundle size. For example, when the aggregation level has 4 types and the reordering state has 3 types (the reordering state 901 to 903), control of 4×3=12 types of TTI bundle sizes becomes possible.

Further, for example, a state where both the PDCCH body 910 and the CRC 920 are reordered may be used. As a result, the reordering state has 4 types, enabling more flexible control of the TTI bundle size.

Notification of TTI bundle size based on PDCCH bit inversion will be described. FIG. 9B is a diagram depicting one example of PDCCH bit inversion. In FIG. 9B, portions identical to those depicted in FIG. 9A are given the same reference numerals used in FIG. 9A and description thereof is omitted.

A bit inversion state 904 is a state of the PDCCH 900 without bit inversion. A bit inversion state 905 is a state of the PDCCH 900 when bit inversion of the PDCCH body 910 has been performed. A bit inversion state 906 is a state of the PDCCH 900 in which bit inversion of the CRC 920 has been performed.

The eNB 210 may select one of the bit inversion states 904 to 906 and transmit the PDCCH 900 to the UE 220. Further, the eNB 210 notifies the UE 220 of a TTI bundle size by a combination of the bit inversion state 904 to 906 and the aggregation level.

Meanwhile, the UE 220, in the blind detection, performs CRC processes respectively corresponding to the bit inversion states 904 to 906 and identifies among the bit inversion states 904 to 906, an error-free bit inversion state. The UE 220 uses a TTI bundle size corresponding to the combination of the identified bit inversion state and the aggregation level and transmits a data CH to the eNB 210.

In this case, the eNB 210 and the UE 220, for example, share information indicating the correspondence relation of the TTI bundle size and the combination of the bit inversion states 904 to 906 and the aggregation level.

As a result, the UE 220 may be notified of the TTI bundle size by the combination of the bit inversion state 904 to 906 and the aggregation level, enabling more flexible control of the TTI bundle size. For example, when the aggregation level has 4 types and the bit inversion state has 3 types (the bit inversion states 904 to 906), control of 4×3=12 types of TTI bundle sizes becomes possible.

Further, for example, a state where both the PDCCH body 910 and the CRC 920 are bit inversed may be used. As a result, the bit inversion state has 4 types enabling more flexible control of the TTI bundle size.

Notification of TTI bundle size based on bit inversion and reordering of PDCCH will be described. The eNB 210 may select a combination of the reordering state 901 to 903 and the bit inversion state 904 to 906 and transmit the PDCCH 900 to the UE 220. Further, the eNB 210 notifies the UE 220 of a TTI bundle size by a combination of the reordering state 901 to 903, the bit inversion state 904 to 906, and the aggregation level.

Meanwhile, the UE 220, in the blind detection, performs CRC processes respectively corresponding to combinations of the reordering state 901 to 903 and the bit inversion state 904 to 906 and identifies an error-free reordering state and bit inversion state. The UE 220 uses a TTI bundle size corresponding to the combination of the identified reordering state, bit inversion state set, and aggregation level and transmits a data CH to the eNB 210.

In this case, the eNB 210 and the UE 220, for example, share correspondence information indicating the correspondence relation of the TTI bundle size and the combination of the reordering state 901 to 903, the bit inversion state 904 to 906, and the aggregation level.

As a result, the UE 220 may be notified of the TTI bundle size by the combination of the reordering state 901 to 903, the bit inversion state 904 to 906, and the aggregation level, enabling more flexible control of the TTI bundle size. For example, when the aggregation level has 4 types and the reordering state and the bit inversion state respectively have 3 types, control of 4×3×3=36 types of TTI bundle sizes becomes possible.

FIG. 10 is a sequence diagram depicting one example of initial access to the eNB by the UE. In FIG. 10, a case where the UE 220 initially accesses the eNB 210 will be described. In the initial access to the eNB 210 by the UE 220, a random access channel (RACH) is used.

The UE 220 wirelessly transmits a random access channel (RACH preamble) to the eNB 210, as message 1 (step S1001). Thereafter, the eNB 210 and the UE 220 perform connection using radio resources such as a downlink physical channel and uplink physical channel prescribed under LTE.

For example, the eNB 210 wirelessly transmits a RACH response, as message 2 (step S1002). In response, the UE 220 wirelessly transmits a RACH message 3 to the eNB 210 (step S1003). In the RACH message 3, for example, a PUSCH is used.

In response, the eNB 210 wirelessly transmits a RACH message 4 to the UE 220 (step S1004). As a result of these steps, the eNB 210 connects the UE 220 and the random access channel received at step S1001 and begins wireless communication with the UE 220.

Control of the TTI bundle size according to the second embodiment is applicable to the control of the TTI bundling count of RACH message 3 at step S1003.

In this manner, according to the second embodiment, the TTI bundle size of uplink communication may be associated with the number of CCEs assigned to the UE 220 in the PDCCH. As a result, TTI bundle size may be changed without having to give direct notification of the TTI bundle size. Thus, increases in the amount of signaling may be suppressed.

In a third embodiment, portions differing from those of the second embodiment will be described. In the third embodiment, in place of TTI bundle size, the RTT is made variable.

FIG. 11 is a diagram depicting one example of changing RTT. In FIG. 11, portions identical to those depicted in FIG. 2B are given the same reference numerals used in FIG. 2B and description thereof is omitted. In the example depicted in FIG. 11, the RTT 243 is 12 [ms], which is shorter than that in the example depicted in FIG. 2B (16 [ms]).

For example, under Alt.1 of LTE described later, shortening the RTT from the current 16 [ms] to 12 [ms] is under consideration. In this regard, in the wireless communications system 200 according to the third embodiment, the RTT is made variable. Therefore, for example, the RTT may be associated with the aggregation level. As a result, direct notification of the TTI bundle size becomes unnecessary and increases in the amount of signaling may be suppressed.

The UE 220 retransmits data by a RTT corresponding to the aggregation level decided by the blind detection. For example, the RTT corresponding to the aggregation level (AL)=1 may be 8 TTI, and the RTT corresponding to the aggregation level (AL)=2 may be 12 TTI.

Figure 12A:
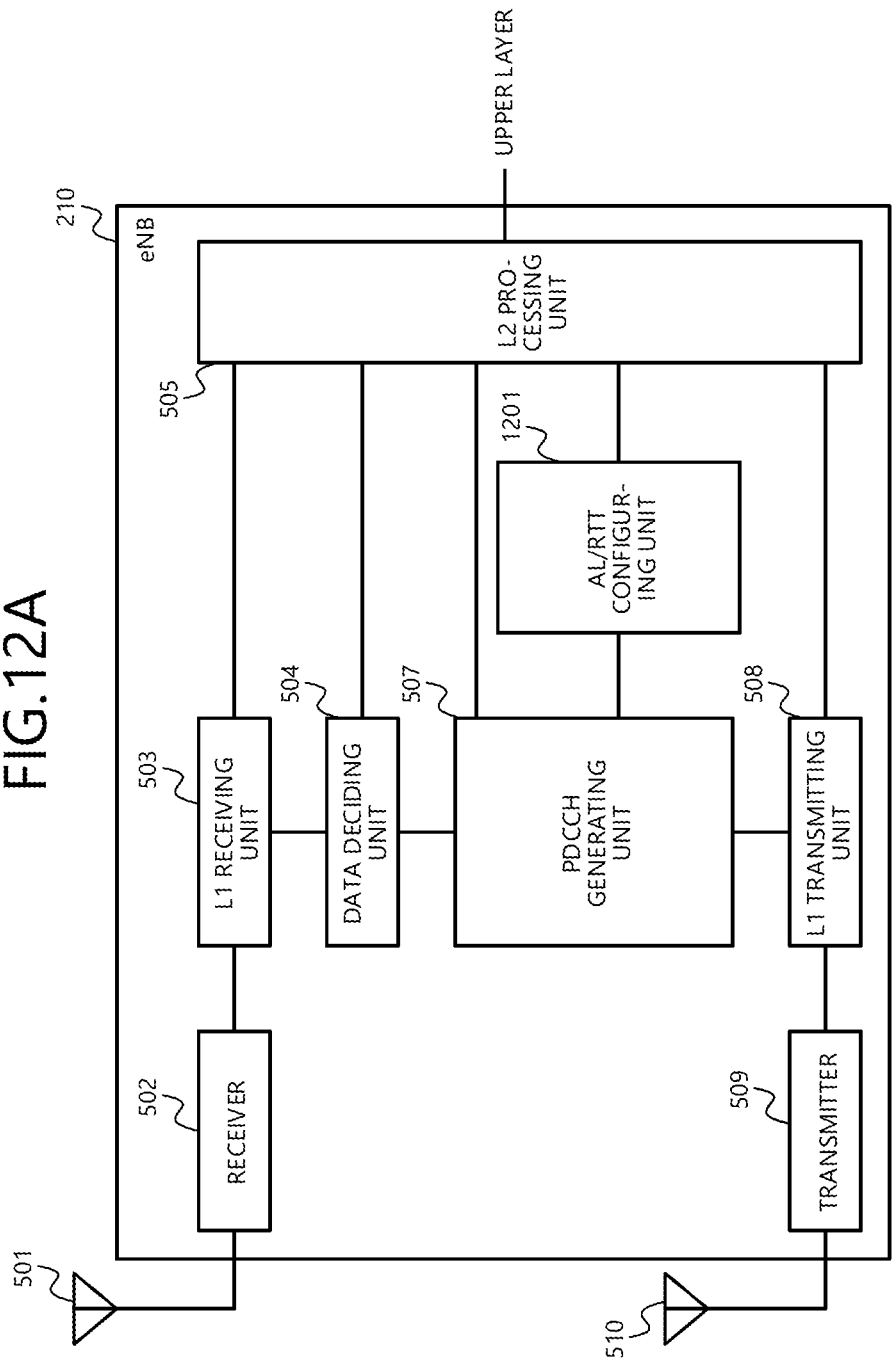
FIG. 12A is a diagram depicting one example of the eNB according to a third embodiment.
Figure 12B:
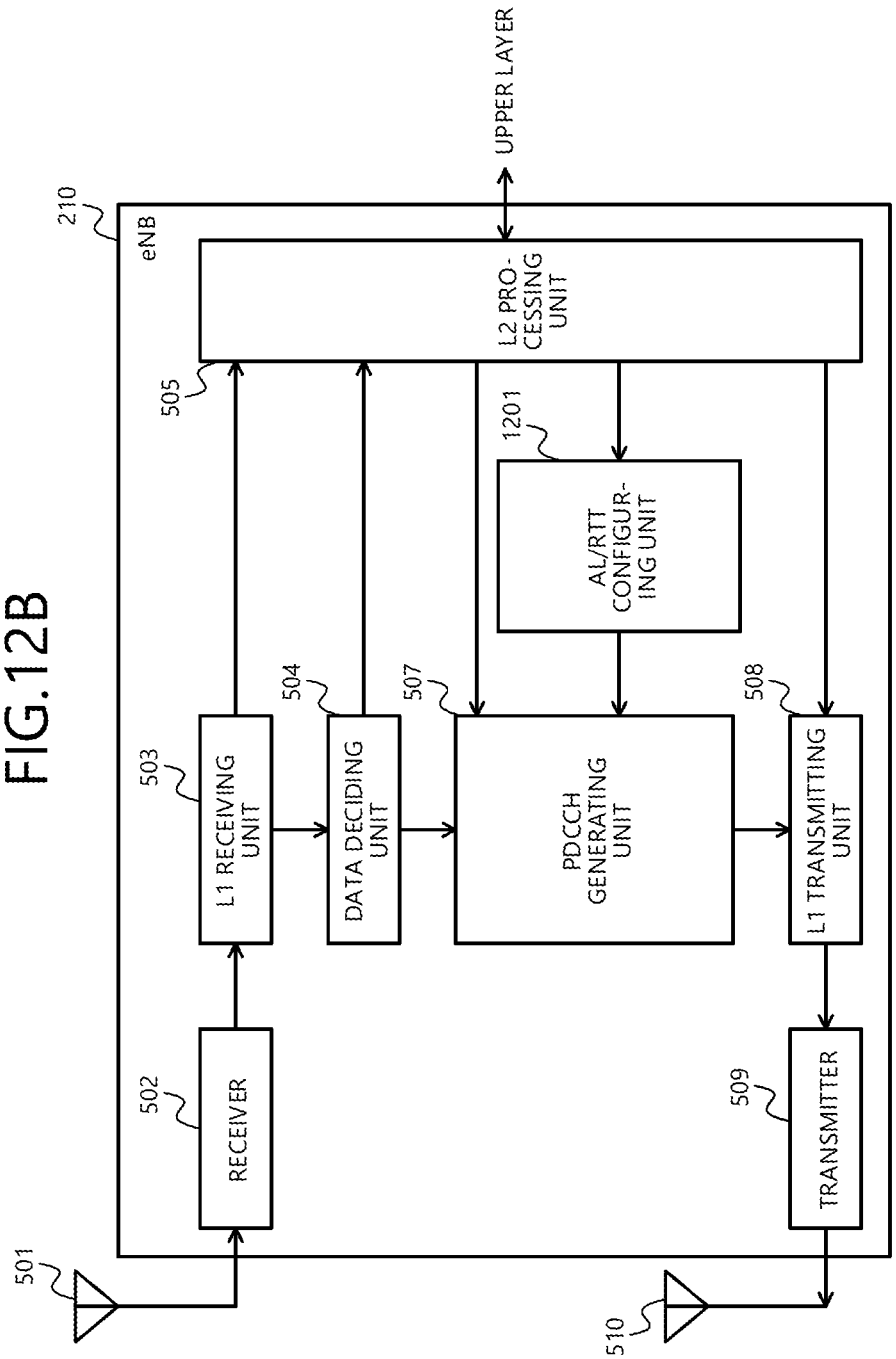
FIG. 12B is a diagram depicting one example of signal flow in the eNB depicted in FIG. 12A.

FIG. 12A is a diagram depicting one example of the eNB according to the third embodiment. FIG. 12B is a diagram depicting one example of signal flow in the eNB depicted in FIG. 12A. In FIGS. 12A and 12B, portions identical to those depicted in FIGS. 5A and 5B are given the reference numerals used in FIGS. 5A and 5B and description thereof is omitted. As depicted in FIGS. 12A and 12B, the eNB 210 according to the third embodiment includes an AL/RTT configuring unit 1201 in place of the AL/bundle size configuring unit 506 depicted in FIGS. 5A and 5B. The AL/RTT configuring unit 1201, for example, may be realized by the CPU 531 depicted in FIG. 5C.

The AL/RTT configuring unit 1201 configures the aggregation level of the AL/RTT configuring unit 1201, based on information indicating the reception state of the UE 220, output from the L2 processing unit 505. The AL/RTT configuring unit 1201 notifies the PDCCH generating unit 507 of the configured aggregation level.

The AL/RTT configuring unit 1201 further configures the RTT of the UE 220 corresponding to the configured aggregation level. For example, the AL/RTT configuring unit 1201 stores correspondence information indicating a predetermined correspondence relation of the RTT and aggregation level. The correspondence information is information indicating the same correspondence relation as the correspondence information stored by the UE 220. The AL/RTT configuring unit 1201 configures based on the stored correspondence information, the RTT of the UE 220 corresponding to the configured aggregation level.

The eNB 210 receives retransmitted data from the UE 220, based on the RTT configured by the AL/RTT configuring unit 1201. The reception of retransmitted data based on the RTT may be performed by the L1 receiving unit 503 and the PDCCH generating unit 507 (L1) or may be performed by the L2 processing unit 505.

Figure 13A:
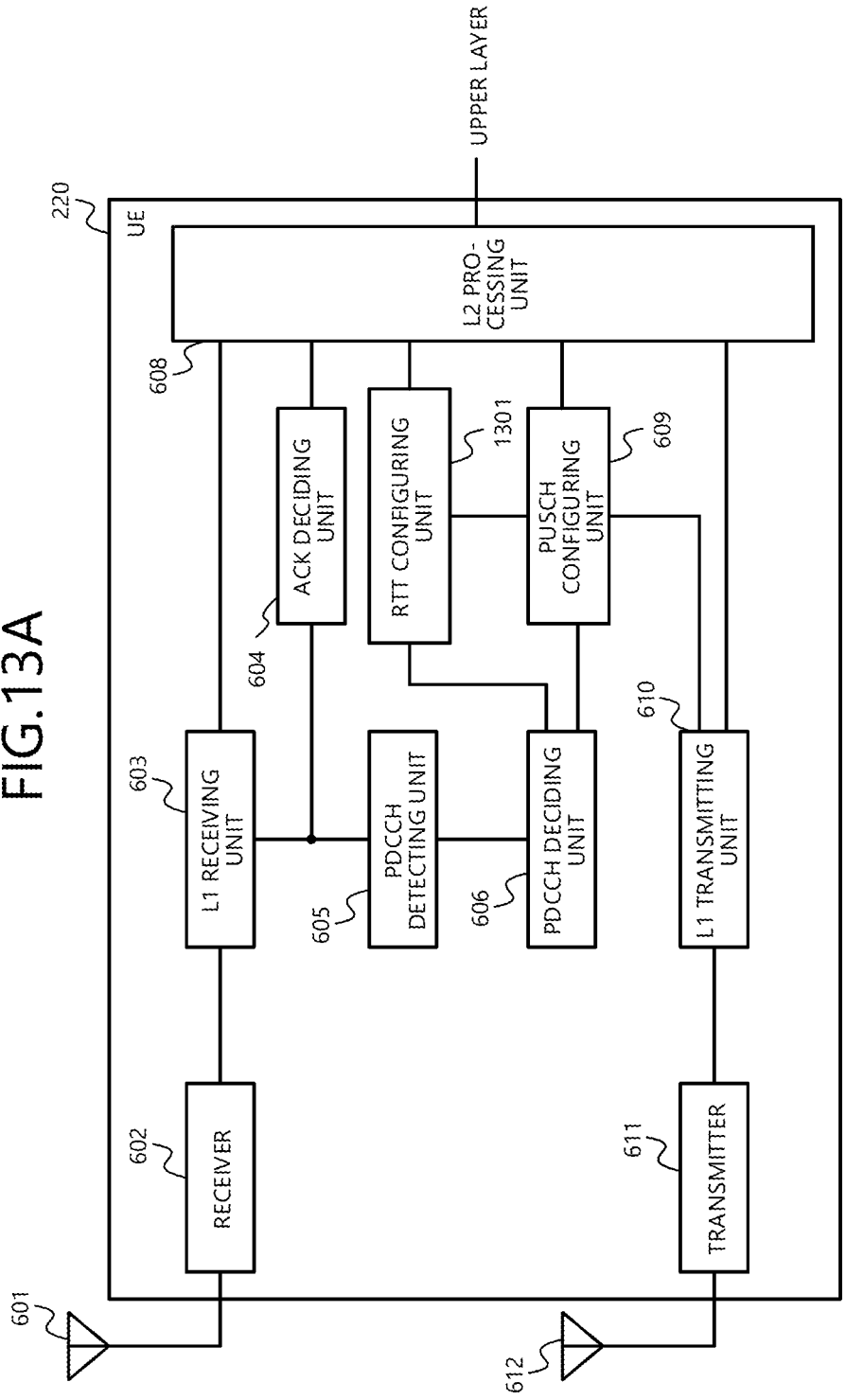
FIG. 13A is a diagram depicting one example of the UE according to the third embodiment.
Figure 13B:
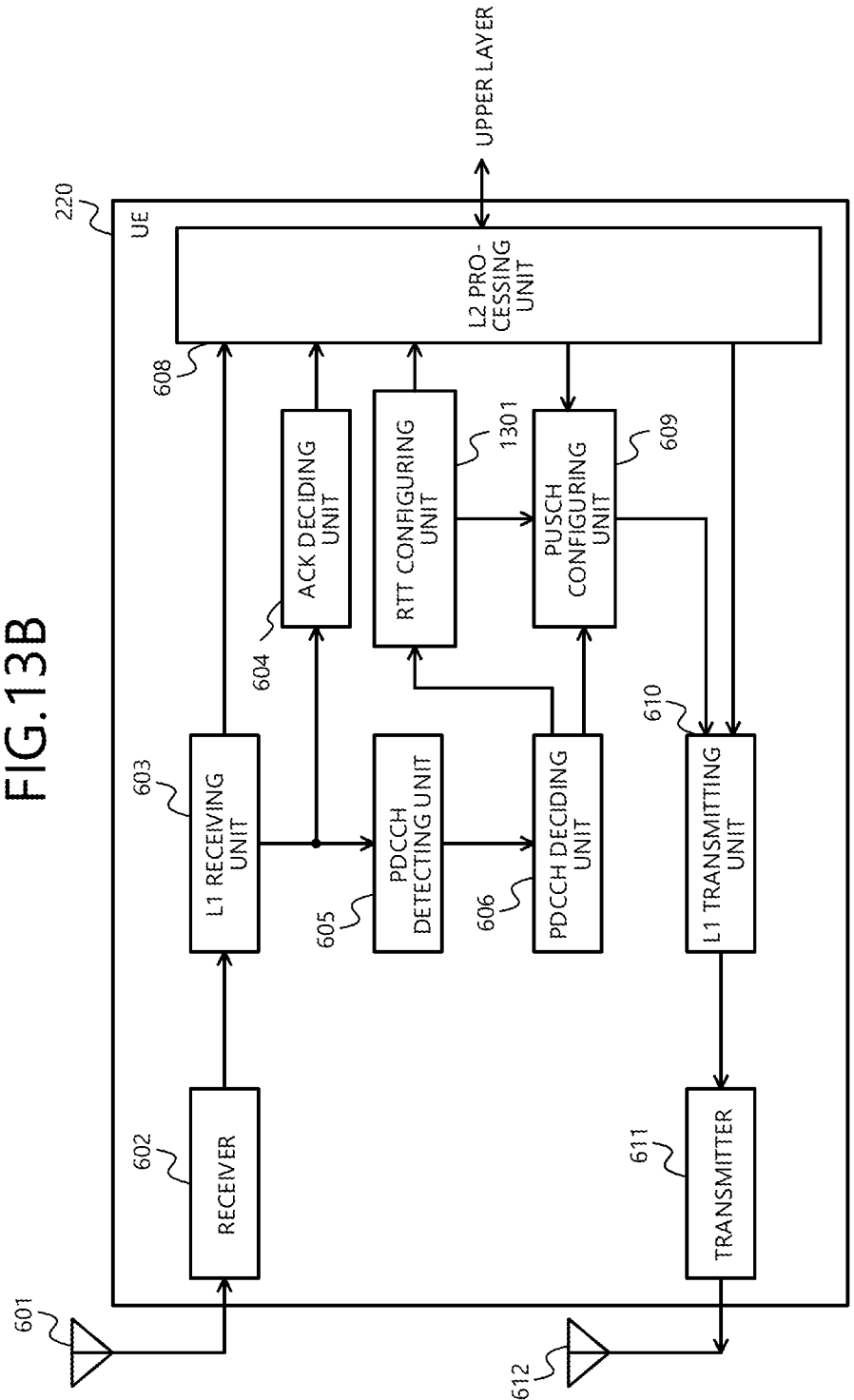
FIG. 13B is a diagram depicting one example of signal flow in the UE depicted in FIG. 13A.

FIG. 13A is a diagram depicting one example of the UE according to the third embodiment. FIG. 13B is a diagram depicting one example of signal flow in the UE depicted in FIG. 13A. In FIGS. 13A and 13B, portions identical to those depicted in FIGS. 6A and 6B are given the same reference numerals used in FIGS. 6A and 6B and description thereof is omitted. As depicted in FIGS. 13A and 13B, the UE 220 according to the third embodiment includes an RTT configuring unit 1301 in place of the bundle size configuring unit 607 depicted in FIGS. 6A and 6B. The RTT configuring unit 1301, for example, may be realized by the CPU 631 depicted in FIG. 6C.

The RTT configuring unit 1301 notifies the PUSCH configuring unit 609 of a RTT corresponding to the aggregation level notified from the PDCCH deciding unit 60. For example, the RTT configuring unit 1301 stores correspondence information indicating a predetermined correspondence relation of the aggregation level and RTT. The correspondence information is information indicating the same correspondence relation as the correspondence information stored by the eNB 210. Based on the stored correspondence information, the RTT configuring unit 1301 notifies the L2 processing unit 608 and the PUSCH configuring unit 609 of a RTT corresponding to the aggregation level notified from the PDCCH deciding unit 606.

The PUSCH configuring unit 609, with respect to retransmitted data from the UE 220 to the eNB 210, configures a PUSCH such that assignment is to time resources (subframes) corresponding to the RTT notified from the RTT configuring unit 1301.

FIG. 14 is a flowchart of one example of processing by the eNB according to the third embodiment. The eNB 210 according to the third embodiment, for example, executes the steps depicted in FIG. 14. The eNB 210 configures (enables) TTI bundling with the UE 220 (step S1401). The configuration at step S1401, for example, may be performed based on RLC layer communication with the UE 220.

The eNB 210 configures the aggregation level of the PDCCH from the eNB 210 to the UE 220, and the RTT of the UE 220 (step S1402). For example, the eNB 210 configures the PDCCH of the aggregation level, based on the CQI reported by the UE 220. Further, the eNB 210 configures a RTT corresponding to the configured aggregation. The eNB 210 transmits the PDCCH to the UE 220 by the aggregation level configured at step S1402 (step S1403).

The eNB 210 receives a data CH by TTI bundling from the UE 220 (step S1404). For example, the eNB 210 receives a data CH at a radio resource indicated by the UL grant stored in the PDCCH transmitted at step S1403. The data CH from the UE 220, for example, is a PUSCH.

The eNB 210 determines whether a period of the TTI bundle size as elapsed since the reception of the data CH started at step S1404 (step S1405). The TTI bundle size, for example, is a fixed TTI (for example, 4 TTIs). If a period of the TTI bundle size has not elapsed (step S1405: NO), the eNB 210 returns to step S1404.

At step S1405, if a period of the TTI bundle size has elapsed (step S1405: YES), the eNB 210 determines whether ACK is to be transmitted for the data CH received at step S1404 (step S1406). The determination at step S1406, for example, may be performed based on whether data from the data CH of the TTI bundle size received at step S1404 is correctly decoded.

At step S1406, if NACK and not ACK is to be transmitted (step S1406: NO), the eNB 210 performs reconfiguration based on the RTT configured at step S1402 (step S1407), and returns to step S1404. If ACK is to be transmitted (step S1406: YES), the eNB 210 ends the series of operations.

FIG. 15 is a flowchart of one example of processing by the UE according to the third embodiment. The UE 220 according to the third embodiment, for example, executes the steps depicted in FIG. 15. Steps S1501 and S1502 depicted in FIG. 15 are identical to steps S801 and S802 depicted in FIG. 8.

At step S1502, if a PDCCH to the UE 220 is detected (step S1502: YES), the UE 220 configures a RTT corresponding to the number of detected PDCCHs to the UE 220 (aggregation level) (step S1503).

The UE 220 transmits a data CH to the eNB 210, by a predetermined TTI bundle size (step S1504). For example, the UE 220 transmits a data CH at a radio resource indicated by the UL grant stored in a detected PDCCH to the UE 220. The predetermined TTI bundle size, for example, is a fixed TTI bundle size (for example, 4 TTIs).

The UE 220 receives a response signal for the data CH transmitted at step S1504 (step S1505). The UE 220 determines whether the response signal received at step S1505 is an ACK (step S1506). If the response signal is not an ACK (step S1506: NO), the UE 220 configures retransmission based on the RTT configured at step S1503 (step S1507), and performs retransmission by returning to step S1504. If the response signal is an ACK (step S1506: YES), the UE 220 ends the series of operations.

A RTT corresponding to the aggregation level may be set similarly to a TTI bundle size corresponding to the aggregation level described in the second embodiment. For example, a RTT corresponding to the aggregation level may be a RTT of a value obtained by multiplying the aggregation level by a predetermined value Nx, i.e., RTT=Nx×aggregation level.

Notification of RTT based on reordering of PDCCH will be described. The eNB 210 may notify the UE 220 of a RTT by a combination of the aggregation level and bit inversion state or reordering state of the PDCCH depicted in FIGS. 9A and 9B.

In this manner, according to the third embodiment, a RTT of uplink communication may be associated with the number of CCEs assigned to the UE 220 in a PDCCH. As a result, the RTT may be changed without requiring direct notification of the RTT. Thus, increases in the amount of signaling may be suppressed.

In the third embodiment, configuration may be such that TTI bundling is not performed.

In a fourth embodiment, portions differing from those in the second embodiment will be described. In the fourth embodiment, a TTI bundling pattern is made variable to make the TTI bundle size variable. The TTI bundling pattern, for example, is a switching pattern of the TTI bundle size, indicating each TTI bundle size of a new transmission, a first retransmission, a second retransmission, . . . of data from the UE 220.

FIG. 16 is a diagram depicting one example of changing of the TTI bundling pattern. In FIG. 16, portions identical to those depicted in FIG. 2B are given the same reference numerals used in FIG. 2B and description thereof is omitted. In the example depicted in FIG. 16, the UE 220 performs TTI bundling of transmitting packets representing the same data, 8 times consecutively at subframes 1602 to 1609 (8 TTIs) 4 [ms] after a subframe 1601 when the UL grant 241 is received.

The response signal 242 is a response signal for the packets transmitted at the subframes 1602 to 1609, and is transmitted from the eNB 210 to the UE 220 at subframe 1610, 4 [ms] after the subframe 1609. In the example depicted in FIG. 16, the response signal 242 is a NACK (negative-acknowledgement signal) indicating that the data represented by the packets transmitted at the subframes 1602 to 1609 could not be properly received (decoded).

The UE 220, having received the response signal 242 (NACK), performs TTI bundling of transmitting packets representing the same data as at the subframes 1602 to 1609, 4 times consecutively at subframes 1611 to 1614. The subframes 1611 to 1614 are subframes after the RTT 243 has elapsed from the subframe 1610.

In this manner, in the fourth embodiment, the TTI bundling pattern indicating each TTI bundle size of a new transmission, a first retransmission, a second retransmission, . . . of data from the UE 220 is made variable. The UE 220 performs the TTI bundling by the TTI bundling pattern corresponding to the aggregation level decided by the blind detection. For example, the TTI bundling pattern corresponding to aggregation level (AL)=1 may be pattern 1, and the TTI bundling pattern corresponding to aggregation level (AL)=2 may be pattern 2, etc.

Further, TTI bundling pattern, for example, may be [4, 4, 4, 4, . . . ], [8, 4, 4, 4, . . . ], [8, 8, 4, 4, . . . ], etc. For example, [8, 4, 4, 4, . . . ] indicates that for a new transmission, the TTI bundle size=8, and for the first, the second, the third, etc. retransmission, the TTI bundle size=4.

For example, under Alt.6.1 of LTE described later, use of a TTI bundle size differing at retransmission, from the TTI bundle size at the new transmission is under consideration. Changing of the TTI bundling pattern described in the fourth embodiment may be applied to changing the TTI bundle size for retransmission and the new transmission when a TTI bundle size differing at retransmission, from the TTI bundle size at the new transmission is used.

Figure 17A:
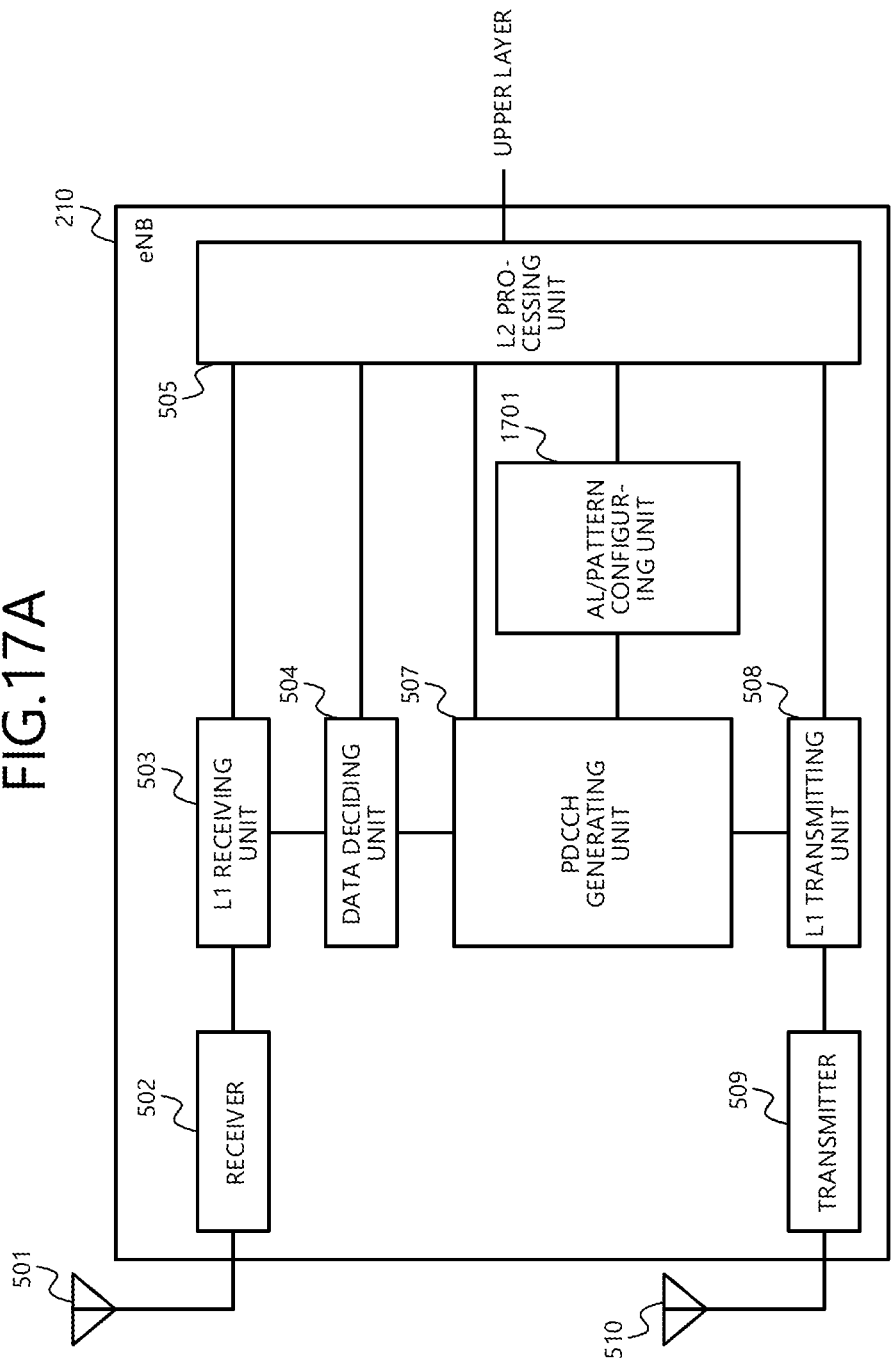
FIG. 17A is a diagram depicting one example of the eNB according to a fourth embodiment.
Figure 17B:
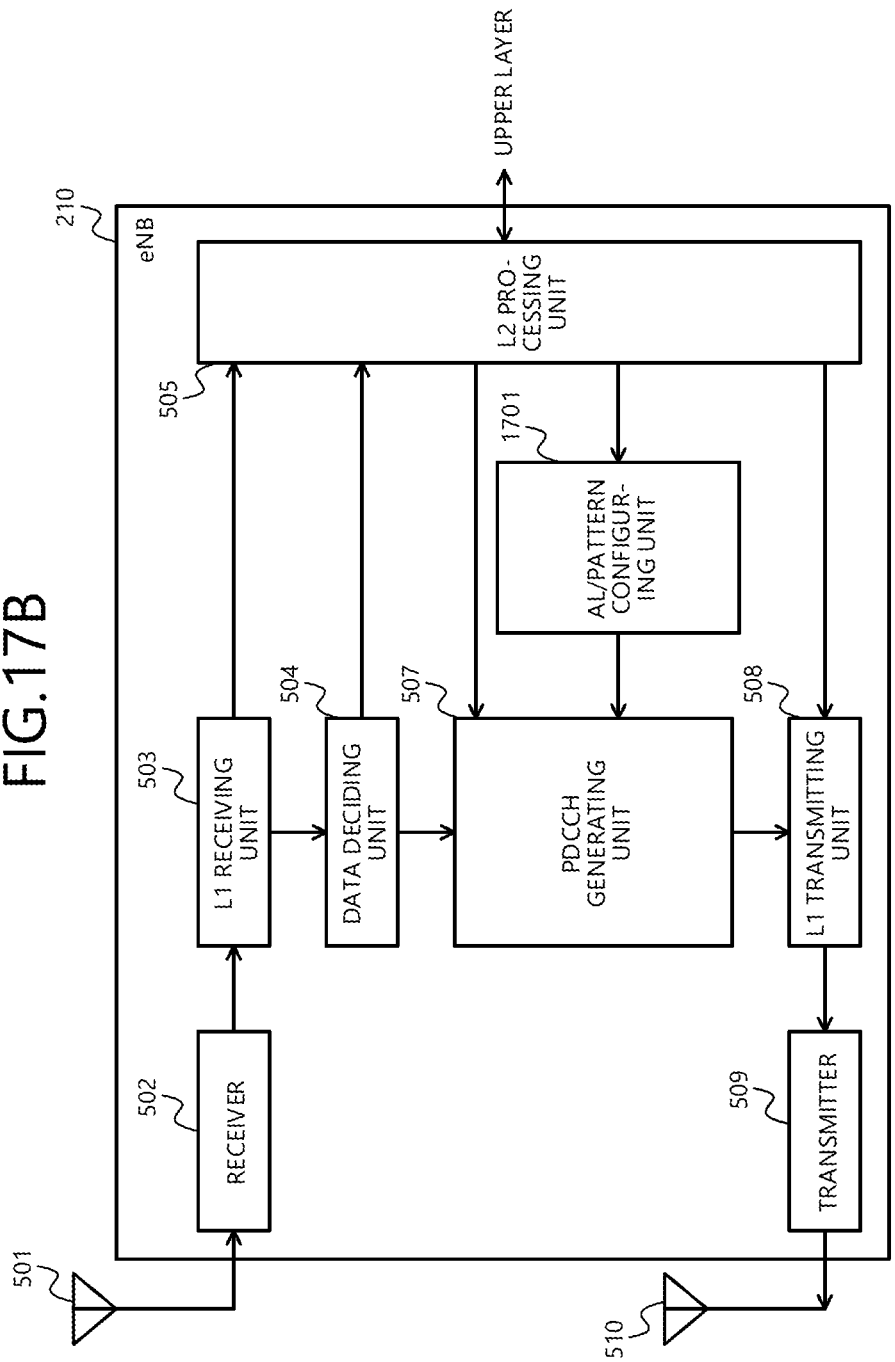
FIG. 17B is a diagram depicting one example of signal flow in the eNB depicted in FIG. 17A.

FIG. 17A is a diagram depicting one example of the eNB according to the fourth embodiment. FIG. 17B is a diagram depicting one example of signal flow in the eNB depicted in FIG. 17A. In FIGS. 17A and 17B, portions identical to those depicted in FIGS. 5A and 5B are given the same reference numerals used in FIGS. 5A and 5B and description thereof is omitted. As depicted in FIGS. 17A and 17B, the eNB 210 according to the fourth embodiment includes an AL/pattern configuring unit 1701 in place of the AL/bundle size configuring unit 506 depicted in FIGS. 5A and 5B. The AL/pattern configuring unit 1701, for example, may be realized by the CPU 531 depicted in FIG. 5C.

The AL/pattern configuring unit 1701 configures the aggregation level of the UE 220, based on the information indicating the reception state of the UE 220, output from the L2 processing unit 505. The AL/pattern configuring unit 1701 notifies the PDCCH generating unit 507 of the configured aggregation level.

The AL/pattern configuring unit 1701 configures a TTI bundling pattern corresponding to the configured aggregation level and notifies the PDCCH generating unit 507 of the configured TTI bundling pattern.

For example, the AL/pattern configuring unit 1701 stores correspondence information indicating a predetermined correspondence relation of the aggregation level and TTI bundling pattern. The correspondence information is information indicating the same correspondence relation as the correspondence information stored by the UE 220. The AL/pattern configuring unit 1701 configures based on the stored correspondence information, the TTI bundling pattern corresponding to the configured aggregation level.

The PDCCH generating unit 507 obtains from the data deciding unit 504, a result of the error detection of the data of the TTI bundle size based on the TTI bundling pattern notified by the AL/pattern configuring unit 1701.

Further, the eNB 210 receives retransmitted data from the UE 220, based on the TTI bundling pattern configured by the AL/pattern configuring unit 1701. The reception of retransmitted data based on the TTI bundling pattern may be performed by the L1 receiving unit 503 and the PDCCH generating unit 507 (L1), or by the L2 processing unit 505.

Figure 18A:
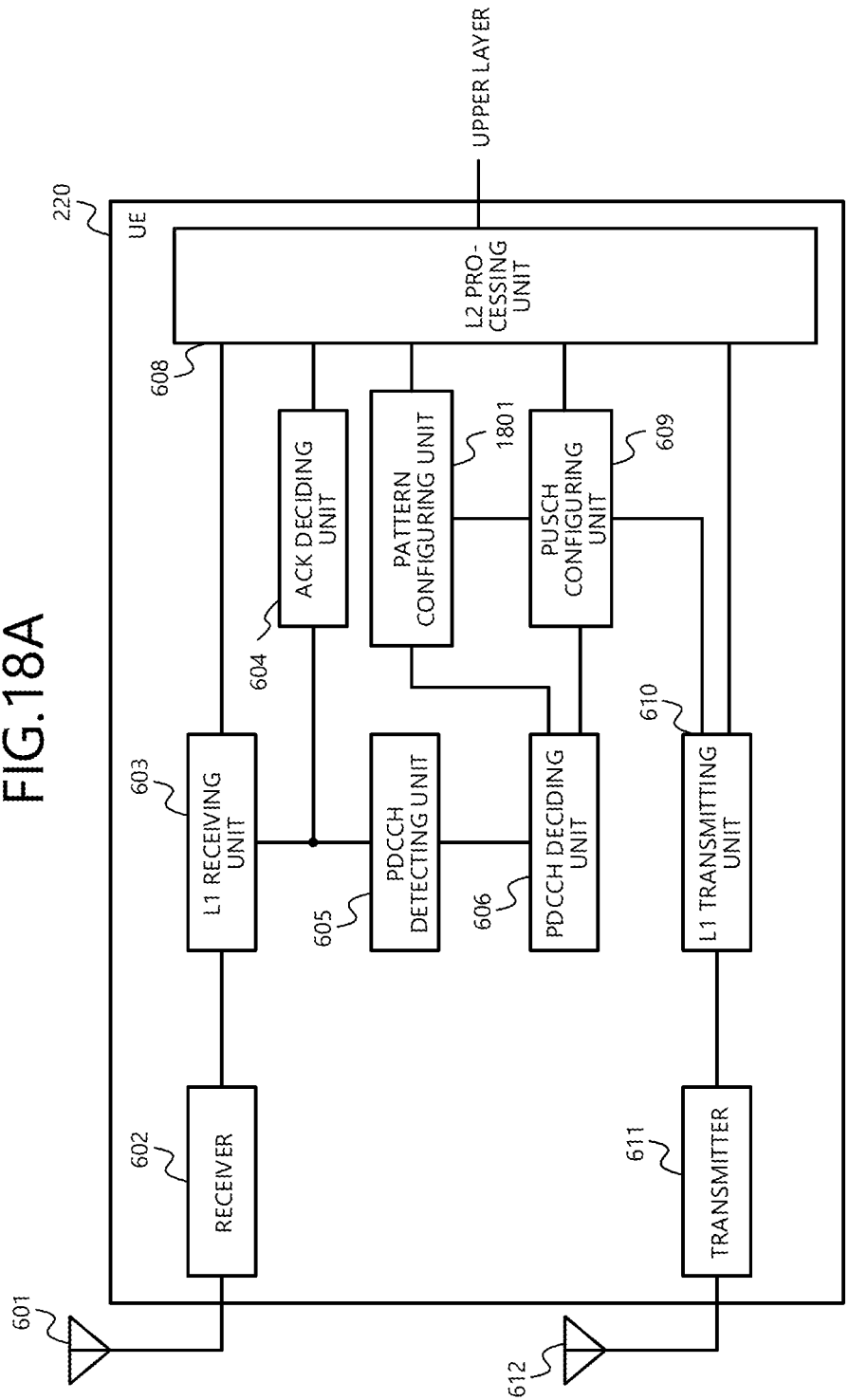
FIG. 18A is a diagram depicting one example of the UE according to the fourth embodiment.
Figure 18B:
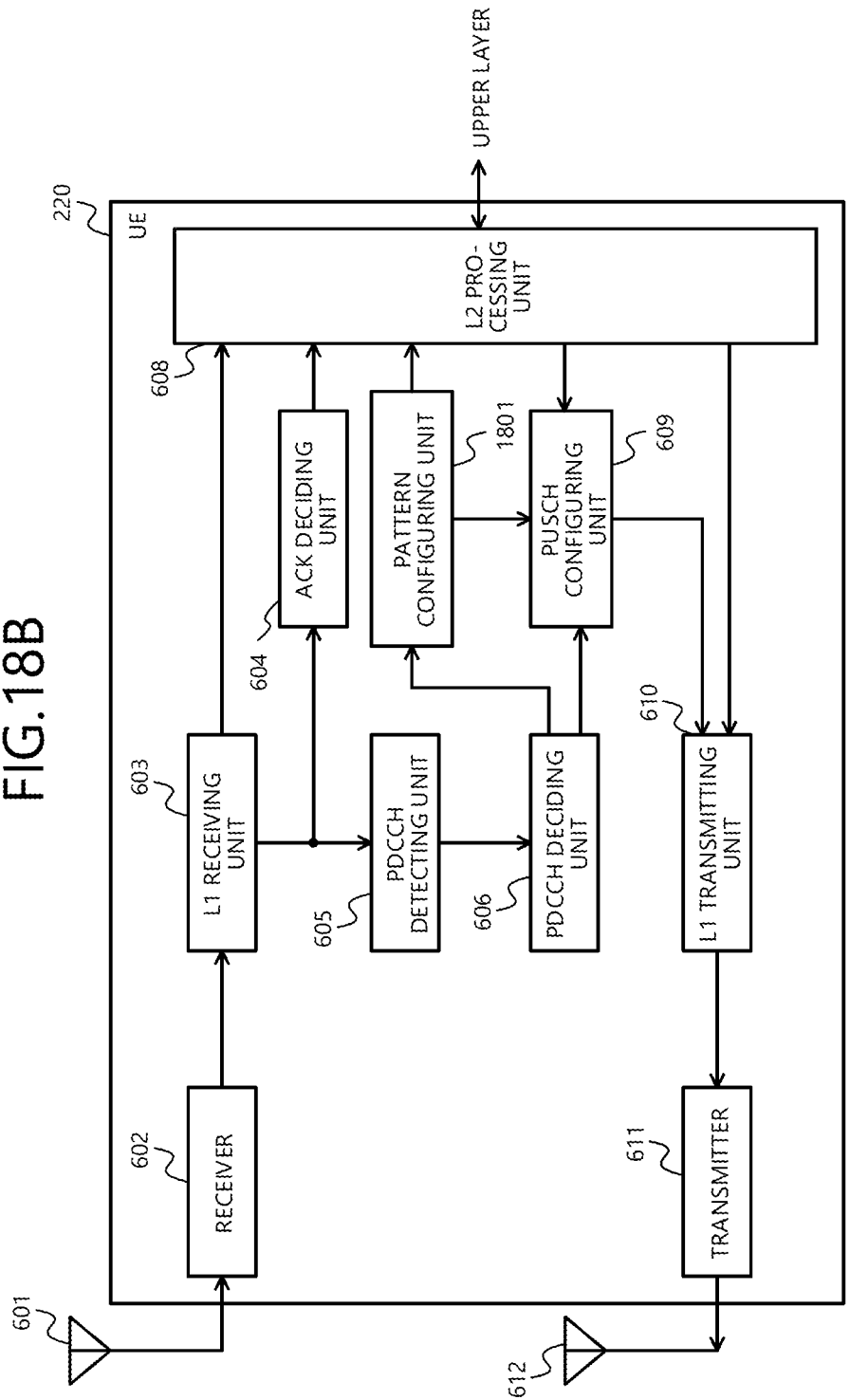
FIG. 18B is a diagram depicting one example of signal flow in the UE depicted in FIG. 18A.

FIG. 18A is a diagram depicting one example of the UE according to the fourth embodiment. FIG. 18B is a diagram depicting one example of signal flow in the UE depicted in FIG. 18A. In FIGS. 18A and 18B, portions identical to those depicted in FIGS. 6A and 6B are given the same reference numerals used in FIGS. 6A and 6B and description thereof is omitted.

As depicted in FIGS. 18A and 18B, the UE 220 according to the fourth embodiment includes a pattern configuring unit 1801 in place of the bundle size configuring unit 607 depicted in FIGS. 6A and 6B. The pattern configuring unit 1801, for example, may be realized by the CPU 631 depicted in FIG. 6C. The pattern configuring unit 1801 notifies the PUSCH configuring unit 609 of a TTI bundling pattern corresponding to the aggregation level notified by the PDCCH deciding unit 606.

For example, the pattern configuring unit 1801 stores correspondence information indicating a predetermined correspondence relation of the aggregation level and TTI bundling pattern. The correspondence information is information indicating the same correspondence relation as the correspondence information stored by the eNB 210. Based on the stored correspondence information, the pattern configuring unit 1801 notifies the L2 processing unit 608 and the PUSCH configuring unit 609 of a TTI bundling pattern corresponding to the aggregation level notified by the PDCCH deciding unit 606.

The PUSCH configuring unit 609 configures a PUSCH such that the same uplink data is transmitted consecutively for the number of times of the TTI bundle size based on the TTI bundling pattern notified by the pattern configuring unit 1801.

Figure 19:
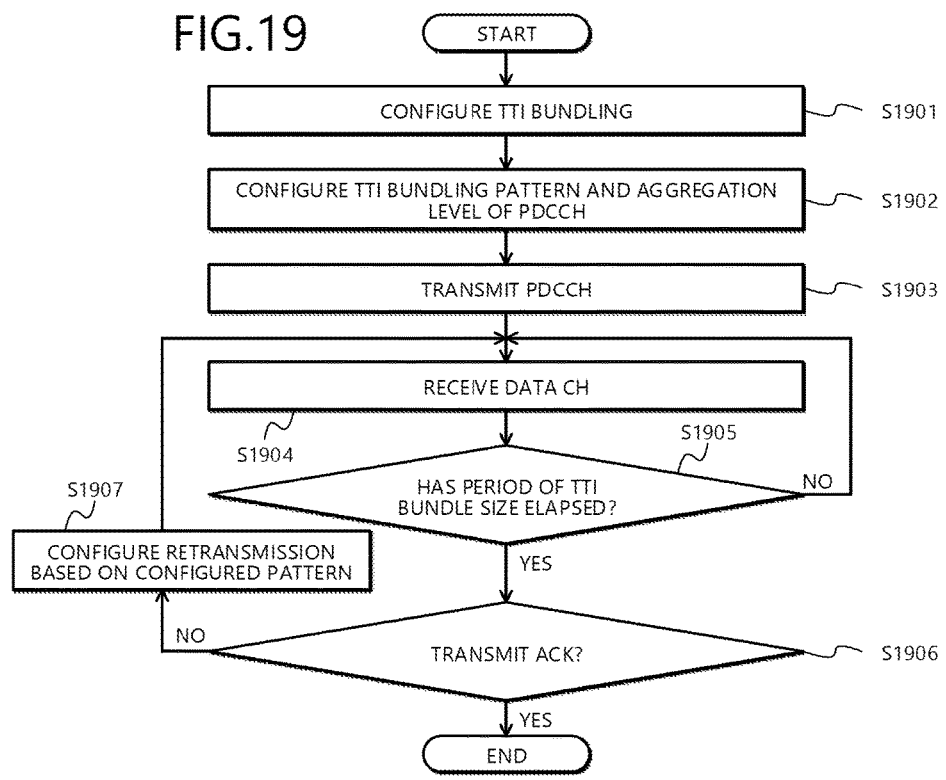
FIG. 19 is a flowchart of one example of processing by the eNB according to the fourth embodiment.

FIG. 19 is a flowchart of one example of processing by the eNB according to the fourth embodiment. The eNB 210 according to the fourth embodiment, for example, executes the steps depicted in FIG. 19. The eNB 210 configures (enables) TTI bundling with the UE 220 (step S1901). The configuration at step S1901, for example, may be performed based on RLC layer communication with the UE 220.

The eNB 210 configures the aggregation level of the PDCCH from the eNB 210 to the UE 220, and the TTI bundling pattern of the UE 220 (step S1902). For example, the eNB 210 configures the aggregation level of the PDCCH, based on a CQI reported by the UE 220. Further, the eNB 210 configures the TTI bundling pattern corresponding to the configured aggregation. The eNB 210 transmits the PDCCH to the UE 220, by the aggregation level configured at step S1902 (step S1903).

The eNB 210 receives a data CH by TTI bundling from the UE 220 (step S1904). At step S1904, the eNB 210, for example, receives a data CH at a radio resource indicated by the UL grant stored in the PDCCH transmitted at step S1903. The data CH from the UE 220, for example, is a PUSCH.

The eNB 210 determines whether a period of the TTI bundle size has elapsed since the reception of the data CH started at step S1904 (step S1905). The TTI bundle size, for example, is the TTI bundle size corresponding to the TTI bundling pattern configured at step S1902. If a period of the TTI bundle size has not elapsed (step S1905: NO), the eNB 210 returns to step S1904.

At step S1905, if a period of the TTI bundle size has elapsed (step S1905: YES), the eNB 210 determines whether ACK is to be is to be transmitted for the data CH received at step S1904 (step S1906). The determination at step S1906, for example, may be performed based on whether data from the data CH of the TTI bundle size, received at step S1904 is correctly decoded.

At step S1906, if NACK and not ACK is to be transmitted (step S1906: NO), the eNB 210 transitions to step S1907. In other words, the eNB 210 configures retransmission based on the TTI bundling pattern configured at step S1902 (step S1907), and returns to step S1904. If ACK is to be transmitted (step S1906: YES), the eNB 210 ends the series of operations.

FIG. 20 is a flowchart of one example of processing by the UE according to the fourth embodiment. The UE 220 according to the fourth embodiment, for example, executes the steps depicted in FIG. 20. Steps S2001 and S2002 depicted in FIG. 20 are identical to steps S801 and S802 depicted in FIG. 8.

At step S2002, if a PDCCH to the UE 220 is detected (step S2002: YES), the UE 220 transitions to step S2003. In other words, the UE 220 configures the TTI bundle size by the TTI bundling pattern corresponding to the number of detected PDCCHs to the UE 220 (aggregation level) (step S2003).

The UE 220 transmits a data CH to the eNB 210, by the TTI bundle size configured at step S2003 (step S2004). At step S2004, the UE 220, for example, transmits a data CH at a radio resource indicated by the UL grant stored in a detected PDCCH to the UE 2220.

The UE 220 receives a response signal for the data CH transmitted at step S2004 (step S2005). The UE 220 determines whether the response signal received step S2005 is an ACK (step S2006). If the response signal is not an ACK (step S2006: NO), the UE 220 configures retransmission based on the TTI bundling pattern corresponding to the aggregation level (step S2007), and returns to step S2003. If the response signal is an ACK (step S2006: YES), the UE 220 ends the series of operations.

A TTI bundling pattern corresponding to the aggregation level may be set similarly to a TTI bundle size corresponding to the aggregation level described in the second embodiment. For example, a TTI bundling pattern corresponding to the aggregation level may be a TTI bundling pattern of a value that is the same as the aggregation level.

Notification of TTI bundling pattern based on reordering of PDCCH will be described. The eNB 210 may notify the UE 220 of a TTI bundling pattern by a combination of the aggregation level and bit inversion state or reordering state of the PDCCH depicted in FIGS. 9A and 9B.

Thus, according to the fourth embodiment, a TTI bundling pattern of uplink communication may be associated with the number of CCEs assigned to the UE 220 in a PDCCH. As a result, the TTI bundling pattern may be changed without requiring direct notification of the TTI bundling pattern. Thus, increases in the amount of signaling may be suppressed.

In a fifth embodiment, portions differing from those in the second embodiment will be described. In the fifth embodiment, in place of TTI bundle size, a HARQ process count is made variable.

FIG. 21 is a diagram depicting one example of changing the HARQ process count. In FIG. 21, portions identical to those depicted in FIG. 2B are given the same reference numerals used in FIG. 2B and description thereof is omitted. In the example depicted in FIG. 21, the UE 220 performs a HARQ process #0 (new transmission) of transmitting uplink data at a subframe 2102, 4 [ms] after a subframe 2101 when the UL grant 241 is received. The UE 220 performs at a subframe 2103 subsequent to the subframe 2102, a HARQ process #1 (new transmission) of transmitting the same data as the HARQ process #0 at the subframe 2102.

The response signal 242 is a response signal transmitted from the eNB 210 to the UE 220, at subframes 2104, 2105, 4 [ms] after the subframes 2102, 2103, for packets transmitted at subframes 2102, 2103. In the example depicted in FIG. 21, the response signal 242 is a NACK (negative-acknowledgement signal) indicating that the data represented by the packets transmitted at the subframes 2102, 2103 could not be properly received (decoded).

The UE 220, having received the response signal 242 (NACK), performs TTI bundling of transmitting packets representing the same data as at the subframes 2102, 2103, 2 times consecutively at subframes 2106, 2107. The subframes 2106, 2107 are subframes after the RTT (4 [ms] in the example depicted in FIG. 21) has elapsed from the subframes 2104, 2105.

In the fifth embodiment, the HARQ process count (2 in the example depicted in FIG. 21) of the UE 220 is made variable. The UE 220 transmits uplink data by a HARQ process count corresponding to the aggregation level decided by the blind detection. For example, the HARQ process count corresponding to aggregation level (AL)=1 may be 1, and the HARQ process count corresponding to aggregation level (AL)=2 may be 2, etc.

For example, under Alt.6.2 of LTE described later, transmission of the same signal by multiple HARQ processes is under consideration. In this regard, in the wireless communications system 200 according to the fifth embodiment, the HARQ process count is made variable. The HARQ process count is the number of HARQ processes of the UE 220, transmitting the same data to the eNB 210.

Thus, for example, the HARQ process count may be associated with the aggregation level. As a result, direct notification of the HARQ process count becomes unnecessary and increases in the amount of signaling may be suppressed.

Figure 22A:
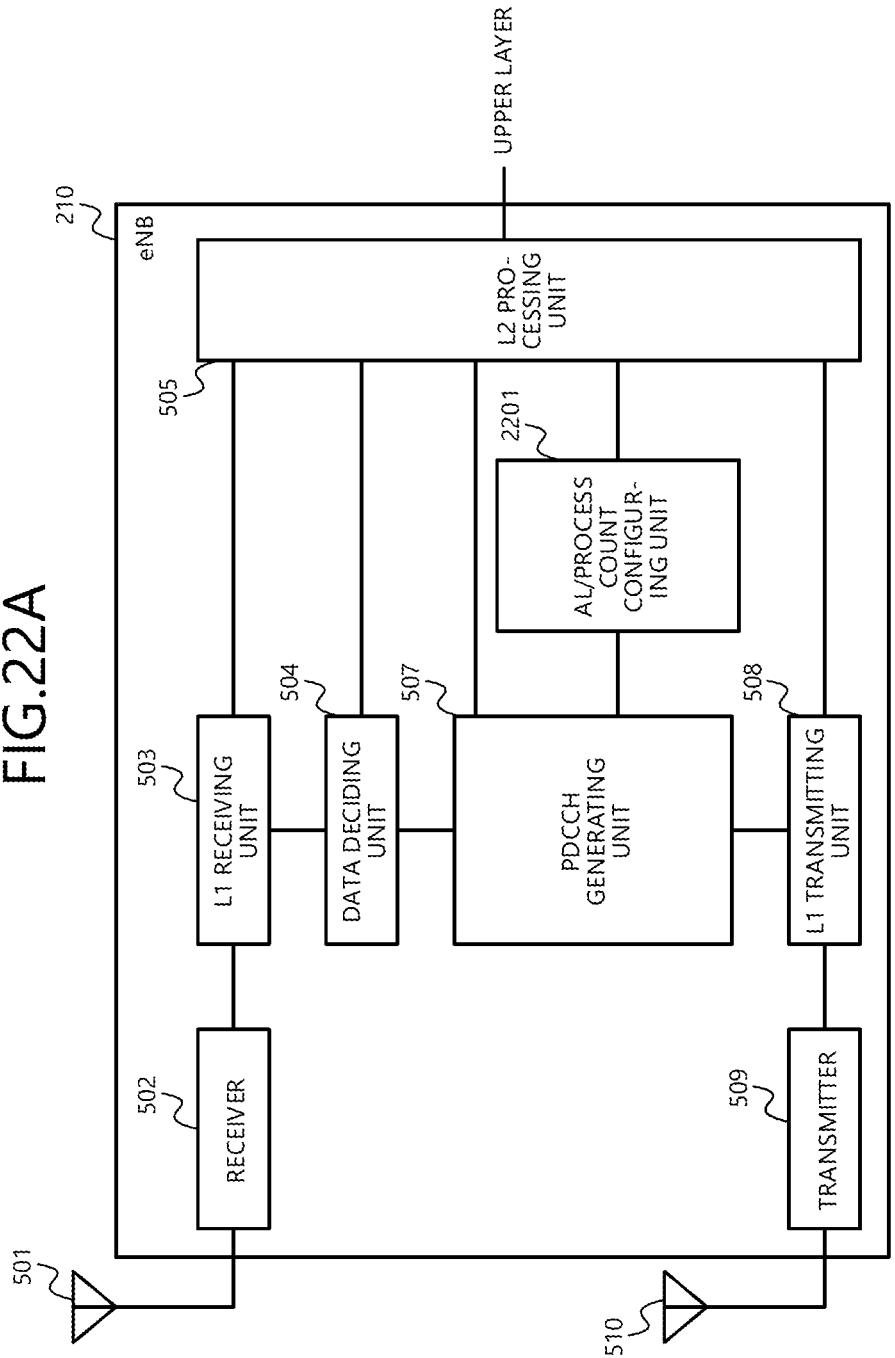
FIG. 22A is a diagram depicting one example of the eNB according to a fifth embodiment.
Figure 22B:
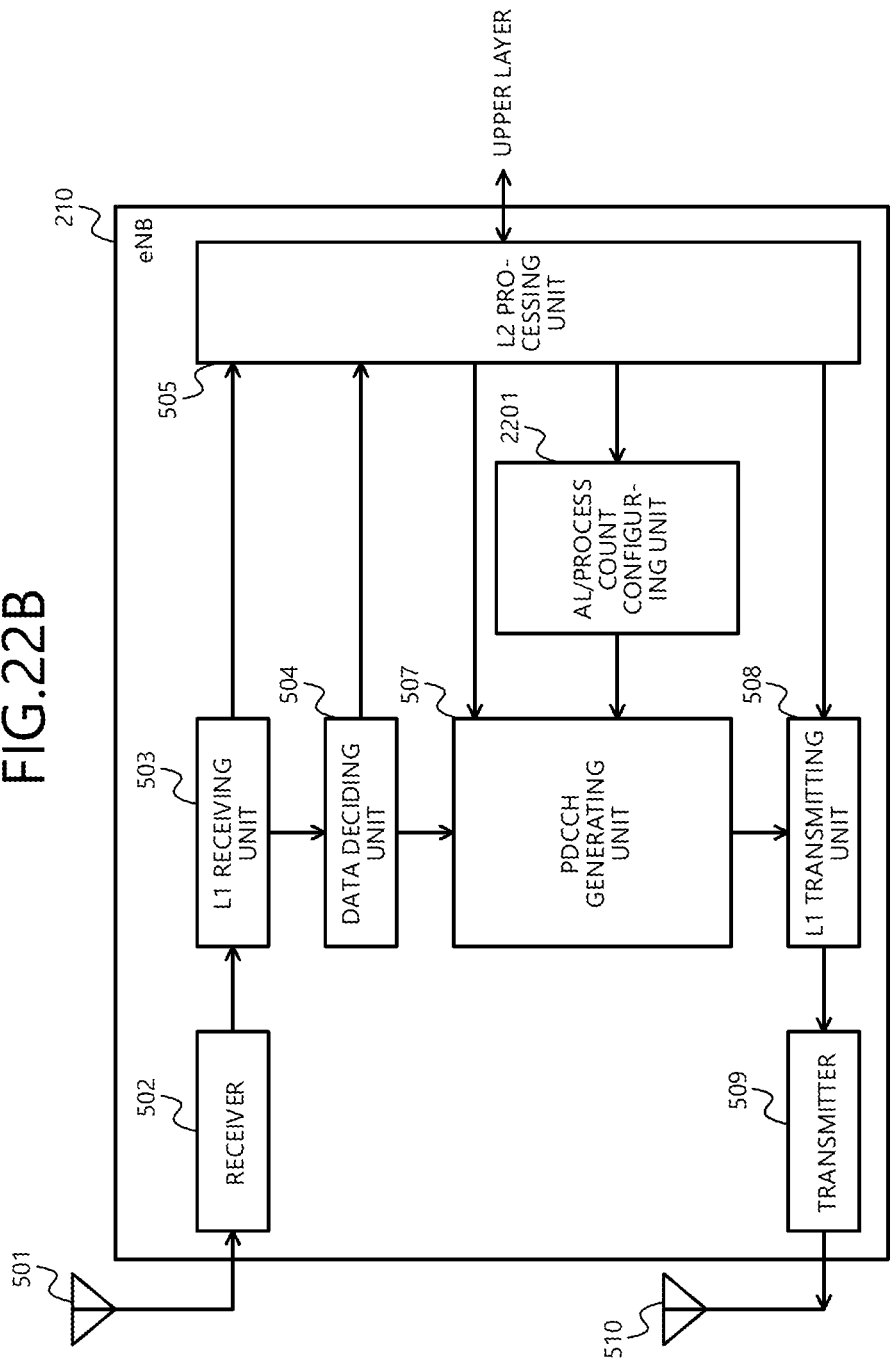
FIG. 22B is a diagram depicting one example of signal flow in the eNB depicted in FIG. 22A.

FIG. 22A is a diagram depicting one example of the eNB according to the fifth embodiment. FIG. 22B is a diagram depicting one example of signal flow in the eNB depicted in FIG. 22A. In FIGS. 22A and 22B, portions identical to those depicted in FIGS. 5A and 5B are given the same reference numerals used in FIGS. 5A and 5B and description thereof is omitted. As depicted in FIGS. 22A and 22B, the eNB 210 according to the fifth embodiment includes an AL/process count configuring unit 2201 in place of the AL/bundle size configuring unit 506 depicted in FIGS. 5A and 5B. The AL/process count configuring unit 2201, for example, may be realized by the CPU 531 depicted in FIG. 5C.

The AL/process count configuring unit 2201 configures the aggregation level of the UE 220, based on the information indicating the reception state of the UE 220 output from the L2 processing unit 505. The AL/process count configuring unit 2201 notifies the PDCCH generating unit 507 of the configured aggregation level.

The AL/process count configuring unit 2201 configures a HARQ process count corresponding to the configured aggregation level. The AL/process count configuring unit 2201 notifies the PDCCH generating unit 507 of the configured HARQ process count.

For example, the AL/process count configuring unit 2201 stores correspondence information indicating a predetermined correspondence relation of the aggregation level and HARQ process count. The correspondence information is information indicating the same correspondence relation as the correspondence information stored by the UE 220. Based on the stored correspondence information, the AL/process count configuring unit 2201 configures a HARQ process count corresponding to the configured aggregation level.

The PDCCH generating unit 507 obtains from the data deciding unit 504, a result of the error detection of data of the HARQ process count notified by the AL/process count configuring unit 2201. The PDCCH generating unit 507 outputs to the L1 transmitting unit 508, a response signal (ACK/NACK) corresponding to the obtained result of the error detection.

The eNB 210 receives data by the HARQ processes from the UE 220, based on the HARQ process count configured by the AL/process count configuring unit 2201. The reception of data based on the HARQ process count may be performed by the L1 receiving unit 503 and the PDCCH generating unit 507 (L1), or the L2 processing unit 505.

Figure 23A:
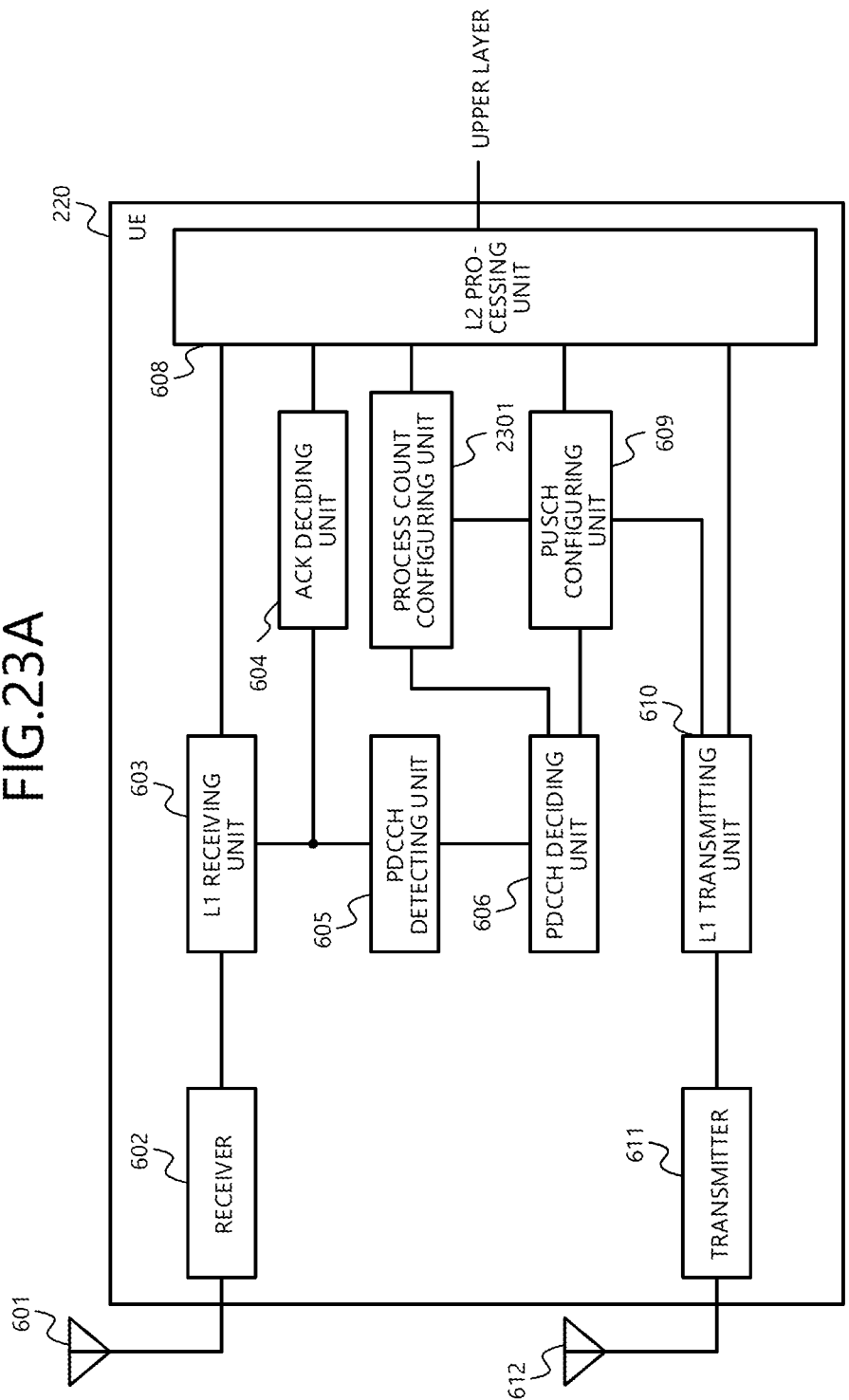
FIG. 23A is a diagram depicting one example of the UE according to the fifth embodiment.
Figure 23B:
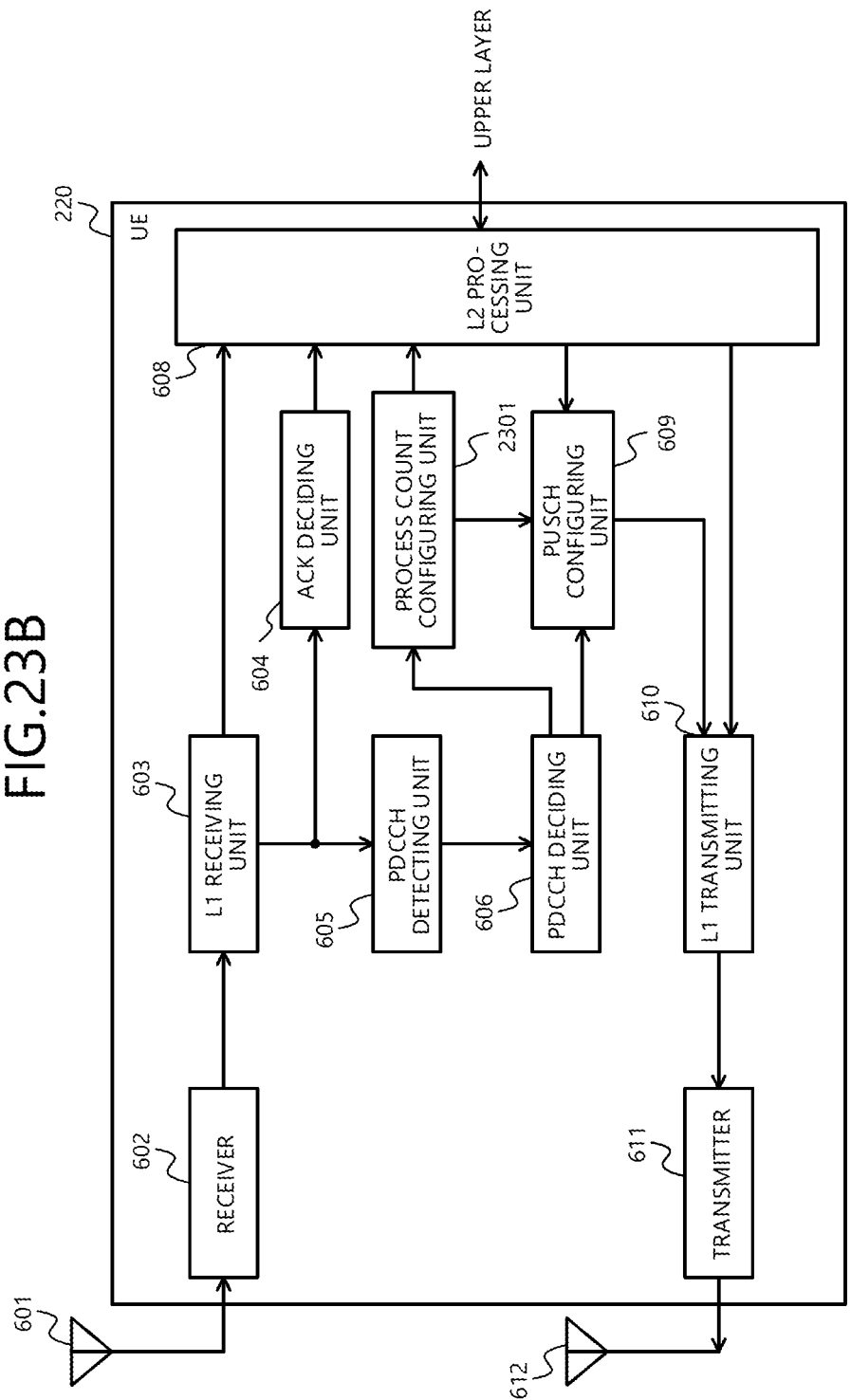
FIG. 23B is a diagram depicting one example of signal flow in the UE depicted in FIG. 23A.

FIG. 23A is a diagram depicting one example of the UE according to the fifth embodiment. FIG. 23B is a diagram depicting one example of signal flow in the UE depicted in FIG. 23A. In FIGS. 23A and 23B, portions identical to those depicted in FIGS. 6A and 6B are given the same reference numerals and description thereof is omitted. As depicted in FIGS. 23A and 23B, the UE 220 according to the fifth embodiment includes a process count configuring unit 2301 in place of the bundle size configuring unit 607 depicted in FIGS. 6A and 6B. The process count configuring unit 2301 は, for example, may be realized by the CPU 631 depicted in FIG. 6C.

The process count configuring unit 2301 notifies the PUSCH configuring unit 609 of a HARQ process count corresponding to the aggregation level notified by the PDCCH deciding unit 606. For example, the process count configuring unit 2301 stores correspondence information indicating a predetermined correspondence relation of the aggregation level and HARQ process count. The correspondence information is information indicating the same correspondence relation as the correspondence information stored by the eNB 210. Based on the stored correspondence information, the process count configuring unit 2301 notifies the L2 processing unit 608 and the PUSCH configuring unit 609 of a HARQ process count corresponding to the aggregation level notified by the PDCCH deciding unit 606.

The PUSCH configuring unit 609 configures a PUSCH such that transmission data by the HARQ processes is assigned, based on the HARQ process count notified by the process count configuring unit 2301.

FIG. 24 is a flowchart of one example of processing by the eNB according to the fifth embodiment. The eNB 210 according to the fifth embodiment, for example, executes the steps depicted in FIG. 24. The eNB 210 configures the aggregation level of the PDCCH from the eNB 210 to the UE 220, and a HARQ process count (step S2401). For example, the eNB 210 configures the aggregation level, based on a CQI reported by the UE 220. Further, the eNB 210 configures a HARQ process count corresponding to the configured aggregation level.

The eNB 210 transmits a PDCCH for the UE 220 by the aggregation level configured at step S2401 (step S2402). The eNB 210 receives a data CH transmitted from the UE 220, by a HARQ process (step S2403). At step S2403, the eNB 210, for example, receives the data CH at a radio resource indicated by the UL grant stored in the PDCCH transmitted at step S2402. The data CH from the UE 220, for example, is a PUSCH.

The eNB 210 transmits a response signal to the UE 220 (step S2404). The response signal transmitted at step S2404 is a response signal (ACK/NACK) corresponding to a result of an error detection of the data CH received at step S2403.

The eNB 210 determines whether a period of the HARQ process count configured at step S2401 has elapsed since the start of the reception of the data CH at step S2403 (step S2405). If a period of the HARQ process count has not elapsed (step S2405: NO), the eNB 210 returns to step S2403.

At step S2405, if a period of the HARQ process count has elapsed (step S2405: YES), the eNB 210 determines whether ACK is to be transmitted for the data CH received at step S2403 (step S2406). The determination at step S2406, for example, may be performed according to whether data from the data CH of the HARQ process count, received at step S2403 is correctly decoded.

At step S2406, if NACK and not ACK is to be transmitted (step S2406: NO), the eNB 210 configures retransmission of the HARQ process count configured at step S2401 (step S2407), and returns to step S2403. If ACK is to be transmitted (step S2406: YES), the eNB 210 ends the series of operations.

FIG. 25 is a flowchart of one example of processing by the UE according to the fifth embodiment. The UE 220 according to the fifth embodiment, for example, executes the steps depicted in FIG. 25. Step S2501 depicted in FIG. 25 is identical to step S802 depicted in FIG. 8.

At step S2501, if a PDCCH to the UE 220 is detected (step S2501: YES), the UE 220 transitions to step S2502. In other words, the UE 220 transmits a data CH to the eNB 210 by the HARQ process count corresponding to the number of detected PDCCHs to the UE 220 (aggregation level) (step S2502). At step S2502, the UE 220, for example, transmits the data CH at a radio resource indicated by the UL grant stored in a detected PDCCH to the UE 220.

The UE 220 receives a response signal for the data CH transmitted at step S2502 (step S2503). The UE 220 determines whether the response signal received at step S2503 is an ACK (step S2504). If the response signal is not an ACK (step S2504: NO), the UE 220 configures retransmission (step S2505), and returns to step S2502. If the response signal is an ACK (step S2504: YES), the UE 220 ends the series of operations.

The TTI bundling pattern corresponding to aggregation level will be described. The HARQ process count corresponding to the aggregation level may be set similarly as a TTI bundle size corresponding to the aggregation level described in the second embodiment. For example, the HARQ process count corresponding to the aggregation level may be a HARQ process count of a value that is the same as the aggregation level.

Further, the HARQ process count corresponding to the aggregation level may be a HARQ process count of a value obtained by multiplying the aggregation level by a predetermined value Nx, i.e., the HARQ process count=Nx× aggregation level.

Notification of HARQ process count based on reordering, etc. of PDCCH will be described. The eNB 210 may notify the UE 220 of a HARQ process count by a combination of the aggregation level and bit inversion state or reordering state of the PDCCH depicted in FIGS. 9A and 9B.

In this manner, according to the fifth embodiment, the HARQ process count of uplink communication may be associated with the number of CCEs assigned to the UE 220 in a PDCCH. As a result, the HARQ process count may be changed without requiring direct notification of the HARQ process count. Thus, increases in the amount of signaling may be suppressed.

In the fifth embodiment, configuration may be such that TTI bundling is not performed.

As described, according to the wireless communications system, the terminal, the base station, and the process method, parameters of the terminal related to uplink communication may be associated with the radio resource count assigned to the terminal in a downlink control channel. As a result, a parameter may be changed without requiring the base station to notify the terminal of the parameter and thereby, enabling increases in the amount of signaling to be suppressed.

For example, techniques of coverage expansion (coverage enhancements) of LTE standards are under consideration. For example, as Rel-11 SI, when an LTE system independently builds a network, probing of a physical channel limiting coverage characteristics is under consideration (3GPP TR36.824 V11.0.0). Further, as Rel-12 WI of Acousto-Optic Tunable Filter (AOTF), coverage enhancement techniques of ULVoIP, etc. are under consideration (3GPP RP-130833).

The contents under consideration are mainly classified as Alt.1, Alt.6.1, Alt.6.2, and Alt.6.3. Alt.1 is reduction of the RTT from 16 [ms] to 12 [ms]. As a result, more retransmission packets may be synthesized within the allowed delay period, increasing gain. Alt.6.1 is changing of the TTI bundle size at a new transmission and retransmission. As a result, the TTI bundle size at a new transmission may be increased, whereby gain increases.

Alt.6.2 is use of multiple HARQ processes to transmit 1 transport block. As a result, more retransmission packets may be synthesized within the allowed delay period, increasing gain. Alt.6.3 is making the TTI bundle size variable according to a control signal. As a result, gain may be adjusted more flexibly.

For example, conventionally, the enabling and disabling of TTI bundling is switched by a control signal of an upper layer (for example, RLC layer) and therefore, changing configurations consumes time, making control that follows wireless channel quality difficult.

Therefore, conventionally, for example, in cases where the wireless channel quality improves rapidly when TTI bundling is enabled, time-frequency resources may be wasted for excess gain. On the other hand, in cases where the wireless channel quality rapidly deteriorates when TTI bundling is enabled, sufficient gain is not obtained and reception characteristics may degrade. Similarly, concerning the RTT and the HARQ process count, flexible adjustment cannot be performed corresponding to the wireless channel quality and therefore, communication cannot be performed efficiently.

In this regard, although variation of the TTI bundle size, etc. is conceivable, signaling is necessary to achieve this. For example, although defining a new bit in a PDCCH is conceivable, the amount of signaling increases. Further, since a new PDCCH format, special types, etc. would have to be defined, the effects on use would be great. Further, for example, although changing of the TTI bundle size by radio resource control (RRC) is conceivable, the change consumes time.

In contrast, according to the embodiments described, the aggregation level of the UL grant (PDCCH) may be associated with the TTI bundle size. Uplink and downlink communication qualities are interrelated. In particular, in time division duplex (TDD), uplink and downlink communication qualities are highly interrelated. In frequency division duplex (FDD) as well uplink and downlink communication qualities are interrelated.

Therefore, associating the aggregation level with TTI bundle size, enables proper TTI bundle size control to be performed without requiring direct communication of the TTI bundle size. As a result, the TTI bundle size is made to be variable and the amount of signaling may be suppressed.

However, with conventional techniques, for example, when the number of consecutive transmissions of the same data by a terminal is made variable, the amount of signaling may increase corresponding with the number of notifications from the base station.

According to one aspect of the present invention, an effect is achieved in that increases in signaling may be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
   a terminal configured to adjust a transmission count of consecutive transmissions of a same data to a base station, based on a radio resource count of radio resources assigned to the terminal, among a plurality of radio resources of a control channel received from the base station; and
   the base station configured to identify the transmission count based on the radio resource count of the radio resources assigned to the terminal among the plurality of radio resources of the transmitted control channel, and receive the same data consecutively transmitted by the terminal, based on the identified transmission count, wherein
   a relation of the radio resource count and the transmission count includes a correspondence relation, the correspondence relation is a relation where the transmission count becomes greater as the radio resource count becomes greater.

2. The wireless communications system according to claim 1, wherein
   the terminal stores a predetermined correspondence relation of the radio resource count and the transmission count, and adjusts the transmission count based on the correspondence relation, and
   the base station stores the correspondence relation, and identifies the transmission count based on the correspondence relation.

3. The wireless communications system according to claim 2, wherein
the base station changes the correspondence relation based on a difference between a first value indicating wireless communication quality from the base station to the terminal and a second value indicating wireless communication quality from the terminal to the base station, and notifies the terminal of the changed correspondence relation.

4. The wireless communications system according to claim 2, wherein the correspondence relation is a correspondence relation of the radio resource count and a switching pattern of the transmission count.

5. The wireless communications system according to claim 1, wherein
the terminal adjusts the transmission count based on a combination of the radio resource count of the assigned radio resources and a state of reordering by the base station with respect to a data string stored in the assigned radio resources, and
the base station identifies the transmission count based on the combination of the radio resource count of the assigned radio resources and the state of the reordering by the base station with respect to the data string stored in the assigned radio resources.

6. The wireless communications system according to claim 5, wherein,
the terminal adjusts the transmission count based on a predetermined correspondence relation of the transmission count and the combination of the radio resource count and the state of the reordering, and
the base station stores the correspondence relation, and identifies the transmission count based on the correspondence relation.

7. The wireless communications system according to claim 1, wherein
the terminal adjusts the transmission count based on a combination of the radio resource count of the assigned radio resources and a state of inversion by the base station with respect to a data string stored in the assigned radio resources, and
the base station identifies the transmission count based on the combination of the radio resource count of the assigned radio resources and the state of inversion by the base station with respect to the data string stored in the assigned radio resources.

8. The wireless communications system according to claim 7, wherein
the terminal stores a predetermined correspondence relation of the state of inversion and the radio resource count, and adjusts the transmission count based on the correspondence relation, and
the base station stores the correspondence relation and identifies the transmission count based on the correspondence relation.

9. The wireless communications system according to claim 1, wherein the base station adjusts the radio resource count of the radio resources assigned to the terminal among the plurality of radio resources of the control channel, based on a value indicating wireless communication quality from the base station to the terminal.

10. The wireless communications system according to claim 1, wherein the transmission count is a transmission time interval (TTI) bundle count in TTI bundling.

11. The wireless communications system according to claim 1, wherein
the control channel is a physical downlink control channel (PDCCH),
the radio resource is a control channel element (CCE), and
the same data is a physical uplink shared channel (PUSCH).

12. The wireless communications system according to claim 1, wherein the same data is a message 3 of a random access channel (RACH).

13. A terminal comprising:
a receiving circuit configured to receive a control channel transmitted from a base station;
an adjusting circuit configured to adjust a transmission count of consecutive transmissions of a same data to the base station, based on a radio resource count of radio resources assigned to the terminal among a plurality of radio resources of the control channel received by the receiving circuit; and
a transmitting circuit configured to consecutively transmit the same data to the base station, for the transmission count adjusted by the adjusting circuit, wherein
a relation of the radio resource count and the transmission count includes a correspondence relation, the correspondence relation is a relation where the transmission count becomes greater as the radio resource count becomes greater.

14. A base station comprising:
a transmitting circuit configured to transmit a control channel;
an identifying circuit configured to identify based on a radio resource count of radio resources assigned to a terminal among a plurality of radio resources of the control channel transmitted by the transmitting circuit, a transmission count of transmissions of a same data by the terminal to the base station; and
a receiving circuit configured to receive based on the transmission count identified by the identifying circuit, the same data transmitted consecutively by the terminal, wherein
a relation of the radio resource count and the transmission count includes a correspondence relation, the correspondence relation is a relation where the transmission count becomes greater as the radio resource count becomes greater.

15. A process method at a terminal, the process method comprising:
receiving, by the terminal, a control channel transmitted from a base station;
adjusting, by the terminal, a transmission count of consecutive transmissions of a same data to the base station, based on a radio resource count of radio resources assigned to the terminal among a plurality of radio resources of the received control channel; and
transmitting, by the terminal, the same data to the base station, consecutively for the adjusted transmission count, wherein
a relation of the radio resource count and the transmission count includes a correspondence relation, the correspondence relation is a relation where the transmission count becomes greater as the radio resource count becomes greater.

16. A process method at a base station, the process method comprising:
transmitting, by the base station, a control channel;
identifying, by the base station and based on a radio resource count of radio resources assigned to a terminal among a plurality of radio resources of the transmitted control channel, a transmission count of transmissions of a same data by the terminal to the base station; and receiving, by the base station and based on the identified transmission count, the same data consecutively transmitted by the terminal, wherein a relation of the radio resource count and the transmission count includes a correspondence relation, the correspondence relation is a relation where the transmission count becomes greater as the radio resource count becomes greater.

17. A wireless communications system comprising:

a terminal configured to adjust based on a radio resource count of radio resources assigned to the terminal among a plurality of radio resources of a control channel received from a base station, a period from transmission of data to the base station until the data is retransmitted; and the base station configured to identify the period based on the radio resource count of the radio resources assigned to the terminal among the plurality of radio resources of the transmitted control channel, and receive based on the identified period, a same data consecutively transmitted by the terminal, wherein a relation of the radio resource count and the period includes a relation where the period becomes greater as the radio resource count becomes greater.

18. A wireless communications system comprising:

a terminal configured to adjust based on a radio resource count of radio resources assigned to the terminal among a plurality of radio resources of a control channel received from a base station, a process count of a process of transmitting a same data to the base station; and the base station configured to identify the process count, based on the radio resource count of the radio resources assigned to the terminal among the plurality of radio resources of the transmitted control channel, and receive based on the identified process count, the same data transmitted by the terminal, wherein a relation of the radio resource count and the process count includes a correspondence relation, the correspondence relation is a relation where the process count becomes greater as the radio resource count becomes greater.

19. The wireless communications system according to claim 18, wherein the process is a hybrid automatic repeat request (HARQ) process.

* * * * *